United States Patent
Akiyama et al.

(10) Patent No.: US 8,395,602 B2
(45) Date of Patent: Mar. 12, 2013

(54) COLOR DISPLAY DEVICE AND PORTABLE ELECTRONIC APPLIANCE USING THE SAME

(75) Inventors: Takashi Akiyama, Sayama (JP); Rintarou Takahashi, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 676 days.

(21) Appl. No.: 11/666,984

(22) PCT Filed: Nov. 7, 2005

(86) PCT No.: PCT/JP2005/020760
§ 371 (c)(1),
(2), (4) Date: May 3, 2007

(87) PCT Pub. No.: WO2006/049337

PCT Pub. Date: May 11, 2006

(65) Prior Publication Data
US 2008/0129714 A1   Jun. 5, 2008

(30) Foreign Application Priority Data
Nov. 5, 2004  (JP) ................................ 2004-322173

(51) Int. Cl.
*G06F 3/038* (2006.01)
(52) U.S. Cl. ........................................ 345/204; 345/55
(58) Field of Classification Search .................. None
See application file for complete search history.

(56) References Cited

U.S. PATENT DOCUMENTS

| | | | |
|---|---|---|---|
| 6,037,876 A * | 3/2000 | Crouch | 340/815.53 |
| 7,046,131 B2 * | 5/2006 | Todorox | 340/444 |
| 2002/0177471 A1 * | 11/2002 | Kaaresoja et al. | 455/567 |
| 2004/0204122 A1 * | 10/2004 | Opela et al. | 455/565 |
| 2005/0245203 A1 * | 11/2005 | Vance | 455/79 |

FOREIGN PATENT DOCUMENTS

| | | |
|---|---|---|
| JP | 05-019257 | 1/1993 |
| JP | 2002-215109 | 7/2002 |

(Continued)

OTHER PUBLICATIONS

Notice of Reasons for Rejection, issued by Japanese Patent Office, dated May 10, 2011, in a Japanese patent application No. 2006-542483 (3 pages).

(Continued)

*Primary Examiner* — Kevin M Nguyen
*Assistant Examiner* — Cory Almeida
(74) *Attorney, Agent, or Firm* — Finnegan, Henderson, Farabow, Garrett & Dunner, L.L.P.

(57) ABSTRACT

The present invention is directed to the provision of an FSC type color display device wherein the frame frequency is set within a range of 20 Hz to 59 Hz, and a portable electronic appliance incorporating such a display device. The color display device according to the present invention includes a plurality of light sources, which emit respectively different colors, and a light source controller for sequentially and selectively emitting of predetermined light source within the plurality of light sources, and repeating the sequential and selective emitting with a predetermined cycle, wherein a frequency of the predetermined cycle is set so that, when the color display device is held stationary, the colors emitted from the plurality of light sources are not visible as separate colors, but when the color display device is in motion, the colors emitted from the plurality of light sources are visible as separate colors.

14 Claims, 23 Drawing Sheets

FOREIGN PATENT DOCUMENTS

| | | |
|---|---|---|
| JP | 2002-223453 | 8/2002 |
| JP | 2002-365611 | 12/2002 |
| JP | 2003-29720 | 1/2003 |
| JP | 2003-162261 | 6/2003 |
| JP | 2004-147071 | 5/2004 |
| JP | 2004-253345 | 9/2004 |
| WO | WO 03/021566 | 3/2003 |

OTHER PUBLICATIONS

Notice of Reasons for Rejection, issued by Japanese Patent Office, dated Aug. 2, 2011, in a Japanese patent application No. 2006-542483 (2 pages).

\* cited by examiner

COLOR DISPLAY DEVICE AND PORTABLE ELECTRONIC APPLIANCE USING THE SAME

FIELD OF THE INVENTION

The present invention relates to a color display device and a portable electronic appliance using such a color display device, and more particularly to a color display device employing a field sequential color system (hereinafter abbreviated "FSC"), which produces a color display by rapidly switching between a plurality of light sources having different emission wavelengths, and a portable electronic appliance using such a color display device. The color display device according to the present invention is capable of enhancing the display performance of illumination (decorative lighting), etc. by switching its driving frequency.

BACKGROUND OF THE INVENTION

Color display devices operating on battery power and capable of displaying color images have come to be used in portable electronic appliances, for example, by mobile phones. Color display devices used in portable electronic appliances are mostly active-matrix liquid crystal color displays using TFT devices, and there are no practical problems in terms of picture quality and display performance.

However, since such a color display device uses a white LED (light-emitting diode) in combination with color filters to achieve full color capability, a problem arises regarding color reproduction, etc. Since a white LED is used as the light source and is constructed by encapsulating a blue LED with a silicone resin containing YAG yellow phosphors to produce white light, the white color is actually blue+yellow, and is deficient in the red wavelength region. As a result, the light contains many yellow components in the red wavelength region. As for the transmission spectrum of the color filter, the color filter should have a peaky (narrowband) characteristic that allows only the specific wavelengths of blue, green, and red to pass through, but actually the color filter has a broad characteristic, allowing yellow components to pass through unattenuated, and as a result, if red is reproduced, it is rendered as yellowish red because of the presence of yellow components. Further, even if the color filter has a peaky spectral characteristic, white balance is disrupted because of the significant lack of red components in the case of the white LED light source. Furthermore, if the spectral characteristic of the color filter becomes peaky, the transmittance of the light source as a whole drops. As a result, for the color display device to retain the required brightness, an even brighter light source has to be used, resulting in an increase in power consumption of the color display device.

This has led to the development of the FSC liquid crystal color display system. As described in patent document 1, the FSC liquid crystal color display system produces a color display by emitting a plurality of light sources of different wavelengths sequentially at a rate of 60 Hz or higher and by applying drive voltage to the liquid crystal synchronized with the emission timing of each light source. The major advantages of the FSC liquid crystal color display system include the following: (1) elimination of the need for color filters contributes to greatly improving transmittance and hence reducing power consumption, (2) since the colors produced by the light sources are directly used for producing color images, a display with enhanced color reproduction can be achieved using RGB light sources having excellent emission wavelength characteristics, and (3) since there is no need to divide each pixel into segments with one for each color of the color filters, a higher resolution display can be achieved. For these and other reasons, the FSC liquid crystal color display system has been attracting attention as a liquid crystal color display system suitable for portable electronic appliances.

The FSC system, however, involves a problem called "color break-up." This is a phenomenon in which, while the human eye tracks a moving object on the screen, RGB component images are focused at different positions on the retina of the eye (refer to patent document 2). Because of this, if the display is driven at a frequency of 60 Hz or higher, which is sufficiently faster than the response speed of the human eye, in the case of a fast-moving white object the RGB colors become visible along the boundary between the object and the background (this phenomenon will hereinafter be called the "color break-up phenomenon"). As the frame display frequency is increased above 60 Hz, the color break-up phenomenon can be gradually reduced and eventually suppressed, however in applications where a liquid crystal panel or the like is used as a light panel, there is a limit to the increase of the frame frequency, and increasing the frequency is not desirable from the standpoint of transmittance and power consumption.

In view of this, a method for alleviating the color break-up phenomenon while retaining the frame frequency of 60 Hz is proposed in patent document 2. That is, the amount of motion is calculated from the motion vector of the object, and the RGB frame images are displayed at respectively different positions so as to match the motion vector of the object, thereby alleviating the color break-up phenomenon.

On the other hand, in patent document 3, the color break-up phenomenon is alleviated by changing the order of the emitting of the RGB components from one emitting cycle to the next. For example, the emitting is performed in the order of R, G, and B in the Kth emitting cycle, in the order of G, B, and R in the (K+1)th cycle, and in the order of B, R, and G in the (K+2)th cycle. With this method, even when the frame frequency is 60 Hz, color break-up occurring on the object becomes difficult to recognize because the respective colors appear as different colors from the Kth to (K+2)th frames and are thus mixed together.

In this way, the color-breakup phenomenon can be alleviated not only by increasing the frame frequency, but also by the above proposed methods. However, while the above methods can alleviate the color-breakup phenomenon better than before, when the display is driven at a frequency of 60 Hz or higher, the color-breakup phenomenon cannot be alleviated when the frame frequency is lower than 60 Hz.

On the other hand, recent mobile phones are equipped with not only the function of displaying information on a color display device, but also the function of visually indicating the reception condition or alerting the user to the arrival of mail by emitting an LED. Some mobile phones are equipped with the function of changing the emitting color or the emitting interval of the LED to identify the source of the call or to indicate whether the received signal is for an incoming mail message or an incoming voice call.

Furthermore, in recent years, portable electronic appliances have been developed such as mobile phones that not only indicate various states of the appliance to the user by using LEDs capable of producing three RGB colors, but also produce various kinds of display effects such as illumination (decorative lighting) by programming the amount of emission of each of the three RGB colors and emitting the LEDs in various colors, for example, during voice communication. Some portable electronic appliances are designed to produce a display that attracts the attention of the user or people around him by means of illumination produced by emitting the three RGB colors in sequence, for example, when an incoming call arrives. Some portable electronic appliances produce a display that attracts the attention of the user or surrounding people, such as a display having an effect similar to that of a neon sign or illuminated advertisement like those used in a marketplace, by emitting the three RGB colors in sequence when an incoming call arrives. Further, some portable electronic appliances are designed to illuminate the entire electronic appliance by arranging several sets of LEDs capable of producing three RGB colors. As described above, portable electronic appliances that make use of three RGB color LEDs as illumination have been increasing in number.

Such illumination capability not only achieves the function of visually communicating information, but also offers the effect of greatly encouraging the user to buy the product by differentiating the product with its design and visual effects. In these circumstances, the development of products with enhanced illumination have been actively under way in recent years.

Patent Document 1: Japanese Unexamined Patent Publication No. H05-19257
Patent Document 2: Japanese Unexamined Patent Publication No. 2002-215109
Patent Document 3: Japanese Unexamined Patent Publication No. 2002-223453

SUMMARY OF THE INVENTION

As described above, a color display device employing an FSC system has had a problem of color break-up, and frame frequency has had to be set to 60 Hz or higher to avoid this problem. That is, a multi-color light source used in an FSC type color display device has been driven at 60 Hz or higher. Furthermore, if an illumination display is to be produced on an FSC type color display device, the light source for the FSC system and for illumination have had to be provided separately, leading to such problems as increased cost and limited freedom of design.

Accordingly, it is an object of the present invention to provide an FSC type color display device wherein the frame frequency is set to within a range of 20 Hz to 59 Hz.

It is also an object of the present invention to provide an FSC type color display device that can produce an illumination display using light source provided for an FSC system.

A color display device according to the present invention includes a plurality of light sources which emit different colors, and a light source controller for sequentially and selectively emitting of a predetermined light source within a plurality of light sources, and repeating the sequential and selective emitting with a predetermined cycle, wherein a frequency of the predetermined cycle is set so that, when the color display device is held stationary, the colors emitted from the plurality of light sources are not visible as separate colors, but when the color display device is in motion, the colors emitted from the plurality of light sources are visible as separate colors.

Preferably, in the color display device according to the present invention, the frequency of a predetermined cycle is set within a range of 20 Hz to 59 Hz.

Preferably, in the color display device according to the present invention, the light source controller controls the light emission of the plurality of light sources by switching between a low-frequency driving mode, in which the frequency of the predetermined cycle is set within a range of 20 Hz to 59 Hz so that, when the color display device is held stationary, colors emitted from the plurality of light sources are not visible as separate colors, but when the color display device is in motion, colors emitted from the plurality of light sources are visible as separate colors, and a high-frequency driving mode, in which the frequency of the predetermined cycle is set to 60 Hz or higher.

Preferably, the color display device according to the present invention further includes an input terminal for receiving a signal for switching between the low-frequency driving mode and the high-frequency driving mode.

Preferably, the color display device according to the present invention further includes a light panel disposed on the viewer side of the plurality of light sources.

Preferably, in the color display device according to the present invention, the light panel includes a liquid crystal panel and a driving circuit for driving the liquid crystal panel.

Preferably, in the color display device according to the present invention, the light panel is a light transmission adjusting member.

Preferably, the color display device according to the present invention further includes a light panel controller for displaying images produced by the plurality of light sources onto the light panel, wherein the light panel controller displays the images in the low-frequency driving mode at the same frequency as the frequency used in the low-frequency driving mode, and in the high-frequency driving mode, at the same frequency as the frequency used in the high-frequency driving mode.

Preferably, the color display device according to the present invention further includes a light panel controller for displaying images produced by the plurality of light sources onto the light panel, wherein the light panel controller displays the images at a predetermined set frequency, whether in the low-frequency driving mode or high-frequency driving mode.

Preferably, in the color display device according to the present invention, the light panel controller displays the images at the same frequency as the frequency used in the high-frequency driving mode, whether in the low-frequency driving mode or high-frequency driving mode.

A portable electronic appliance according to the present invention includes a plurality of light sources, which emit different colors, and a light source controller for sequentially and selectively emitting of a predetermined light source within the plurality of light sources, and repeating the sequential and selective emitting with a frequency of a predetermined cycle, wherein the light source controller controls the light emission of the plurality of light sources by switching between an illumination mode, in which a frequency of the predetermined cycle is set within a range of 20 Hz to 59 Hz so that, when the portable electronic appliance is held stationary, colors emitted from the plurality of light sources are not visible as separate colors, but when the portable electronic appliance is in motion, colors emitted from the plurality of light sources are visible as separate colors, and an image display mode, in which the frequency of the predetermined cycle is set to 60 Hz or higher.

Preferably, in the portable electronic appliance according to the present invention, the light source controller switches between the illumination mode and image display mode according to whether the portable electronic appliance is in a voice communication mode or not.

Preferably, the portable electronic appliance according to the present invention further includes a motor for vibrating the electronic appliance in order to indicate an incoming call to a user, wherein the light source controller switches between the illumination mode and image display mode according to whether the motor is driven or not.

Preferably, the portable electronic appliance according to the present invention further includes a first casing, second casing, a hinge for connecting the first casing and the second casing in a rotatable manner, and a detector for detecting the rotation of the hinge, wherein switching is made between the illumination mode and the image display mode according to whether or not the detector has detected the rotation of the hinge.

Preferably, the portable electronic appliance according to the present invention further includes a detector for detecting the arrival of a mail message or an incoming call, wherein switching is made between the illumination mode and the image display mode according to whether or not the detector has detected the arrival of a mail message or an incoming call.

Preferably, the portable electronic appliance according to the present invention further includes an acceleration sensor or a tilt sensor, wherein switching is made between the illumination mode and the image display mode according to a result of detection performed by the acceleration sensor or tilt sensor.

The color display device according to the present invention is a field sequential color display device which produces a color display by sequentially and selectively emitting a plurality of light sources having different light emission wavelengths and by repeating a cycle which defines from a first selection of the plurality of light source to a final selection of the plurality of light source, wherein the frequency of the cycle is set within a range of 20 Hz to 59 Hz.

Preferably, in the color display device according to the present invention, the plurality of light sources are selected sequentially one at a time or two or more in combination, the sequential selection of the plurality of light sources being repeated with a frequency of the cycle of 20 Hz to 59 Hz, and a period during which all of the plurality of light sources are turned off is interposed between the selection period of one light source and the selection period of the next light source.

Preferably, in the color display device according to the present invention, the color display device has at least two driving modes, one of which is the low-frequency driving mode in which the selection of the light sources is repeated with a frequency of the cycle of 20 Hz to 59 Hz, and the other one of which is the high-frequency driving mode in which the selection of the light sources is repeated with a frequency of the cycle of 60 Hz or higher.

Preferably, the color display device according to the present invention is switched between the at least two modes under software control or under the control of an externally applied electrical control signal.

Preferably, in the color display device according to the present invention, a light panel is disposed on the viewer side of the plurality of light sources.

Preferably, in the color display device according to the present invention, the light panel is a light transmission adjusting member.

Preferably, in the color display device according to the present invention, the light panel includes a liquid crystal panel and a driving circuit for driving the liquid crystal panel.

Preferably, in the color display device according to the present invention, the light panel is used to display images produced by the plurality of light sources, and the frequency at which the images are displayed is the same as the light source switching frequency used in the low-frequency driving mode or high-frequency driving mode, whichever is currently selected.

Preferably, in the color display device according to the present invention, the light panel is used to display images produced by the plurality of light sources, and the subframe frequency at which the images are displayed is the same as the light source switching frequency used in the low-frequency driving mode or high-frequency driving mode, whichever is currently selected.

Preferably, in the color display device according to the present invention, the light panel is used to display images produced by the plurality of light sources, and the subframe frequency at which the images are displayed is the same as the light source switching frequency used in the high-frequency driving mode, regardless of whether the currently selected mode is the low-frequency driving mode or the high-frequency driving mode.

The portable electronic appliance according to the present invention comprises the color display device of the present invention described above, an antenna, a receiver, a transmitter, and a controller for controlling the entire operation, wherein under the control of a signal supplied from the controller for controlling the entire operation, the portable electronic appliance is switched between an illumination mode, in which the color display device is driven in the low-frequency driving mode, and an image display mode, in which the color display device is driven in the high-frequency driving mode.

Preferably, in the portable electronic appliance according to the present invention, switching is made between the illumination mode and the image display mode in synchronism with a state transition signal that indicates whether the user is in a voice communication mode or not.

Preferably, the portable electronic appliance according to the present invention further includes a vibrator function, which upon reception of an incoming call at the antenna, drives a motor thereby causing the portable electronic appliance to vibrate in order to indicate the incoming call to the user, wherein switching is made to the illumination mode in synchronism with the activation of the vibrator function.

Preferably, the portable electronic appliance according to the present invention further includes a first casing and a second casing connected via a hinge in a rotatable manner, at least one color display device mounted in the first casing, and a detector for detecting the rotation of the hinge, wherein switching is made between the illumination mode and the image display mode in synchronization with a detection signal output by the detector.

Preferably, in the portable electronic appliance according to the present invention, switching is made to the illumination mode when displaying an image on the color display device in order to indicate the arrival of a mail message or a voice call to the user.

Preferably, the portable electronic appliance according to the present invention further includes an acceleration sensor or a tilt sensor, and detects the direction of tilt or the moving speed of the appliance based on the output of the acceleration sensor or tilt sensor, wherein when a motion is detected, a different image is displayed, and at the same time, switching is made to the illumination mode.

According to the present invention, by emitting the plurality of light sources used in the FSC type color display device sequentially one at a time or two or more in combination, and by setting the frame frequency within a range of 20 Hz to 59 Hz, a display having an illumination effect can be produced. In the illumination mode in which the frame frequency is set within a range of 20 Hz to 59 Hz, the color break-up phenomenon becomes easier to occur, so that, when the user moves the portable electronic appliance, the display emits in the plurality of light source colors according to the amount of movement, achieving an attractive illumination effect.

Further, in the present invention, when the frame frequency is made switchable, the color break-up phenomenon can be alleviated by switching the frame frequency to 60 Hz or higher.

DETAILED DESCRIPTION OF THE PREFERRED EMBODIMENT

A color display device and a portable electronic appliance according to the present invention will be described below with reference to the drawings.

Figure 1:
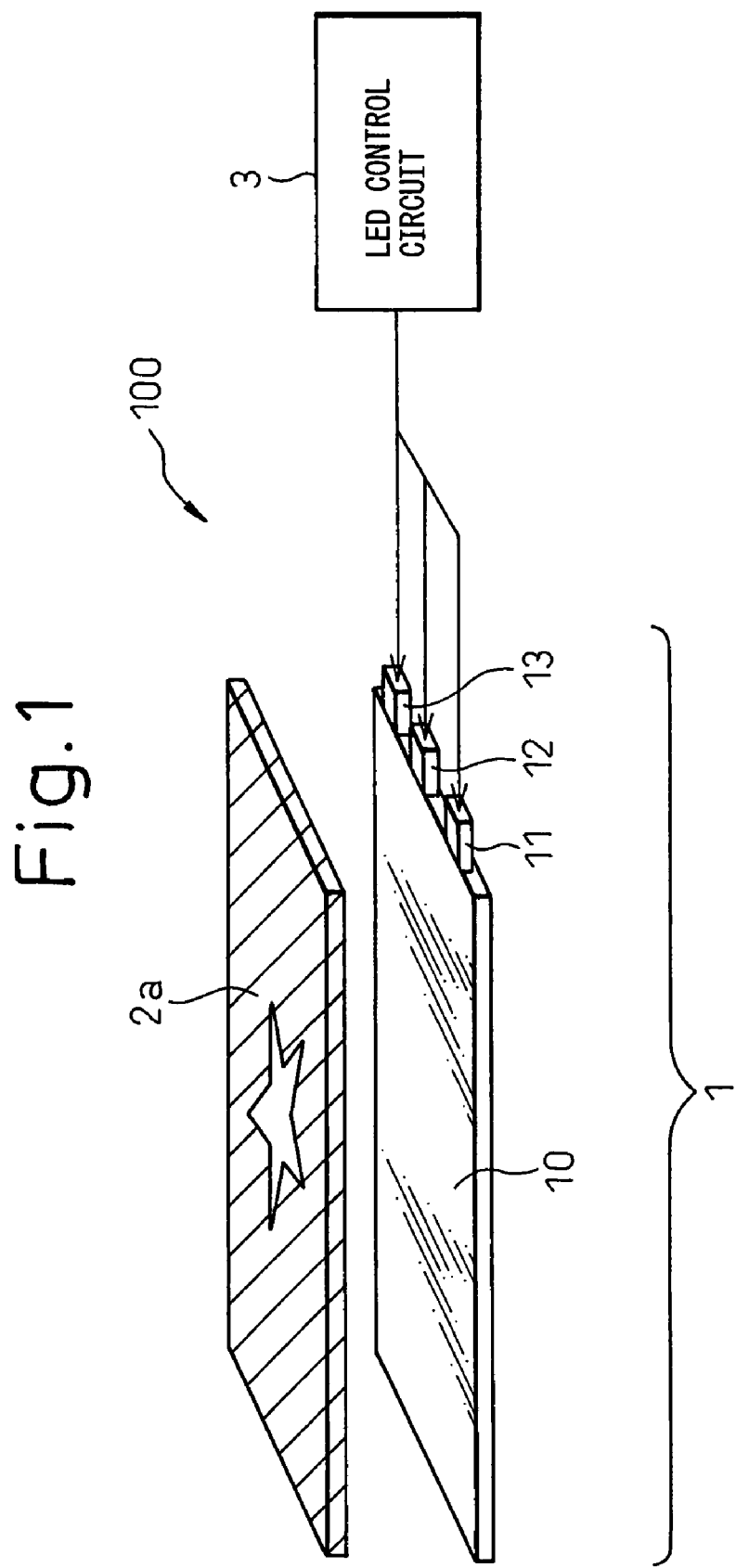
FIG. 1 is a diagram showing in simplified form the configuration of an FSC type color display device according to a first embodiment of the present invention.

FIG. 1 is a diagram showing in simplified form the configuration of a color display device according to a first embodiment of the present invention.

As shown in FIG. 1, the color display device 100 comprises a light source 1, a light transmission adjusting member 2a, and an LED control circuit 3.

The light source 1 comprises a light-conducting plate 10 and a plurality of light sources having different emission wavelengths (an R LED 11 for emitting red color light, a G LED 12 for emitting green color light, and a B LED 13 for emitting blue color light) arranged along an end face of the light-conducting plate 10. The light-conducting plate 10 is constructed by forming a prism on a transparent substrate formed from an acrylic resin. A reflecting plate (not shown) is bonded to the bottom surface of the light-conducting plate 10. Light entering from the end face and diffused over the bottom surface is reflected by the reflecting plate into the opposite direction to illuminate the other surface of the light-conducting plate 10 (in the figure, the top surface).

The LED control circuit 3 selects each of the LEDs and controls at least the light-emission period (ON period and OFF period) of each selected LED and the ON/OFF repetition period of each LED. The forward voltage Vf required for causing light emission is different for each of the R LED 11, G LED 12, and B LED 13, but the LED control circuit performs constant-current control to ensure stable operation of the LEDs. Further, the LED control circuit 3 uses a constant-current circuit that satisfactorily responds within 100 μs so as to follow the ON/OFF control. Accordingly, if each LED is turned on and off cyclically with the LED light-emission period fR, the LED can be made to emit light with the constant current in the ON period and can be instantly turned off in the OFF period.

The light transmission adjusting member 2a as a light panel is disposed on the viewer side of the light source 1. Any suitable structure can be employed for the light panel as long as it can control the amount of light transmission from the light source 1. In the first embodiment, a achromatic color transparent polycarbonate film, which is painted black, except for a star-shaped portion, is used as the light transmission adjusting member 2a. The light transmission adjusting member 2a is not limited to this particular film, but any suitable member may be used as long as it has a light blocking portion and a light transmitting portion. Here, the light transmitting portion may be semitransparent.

Figure 2:
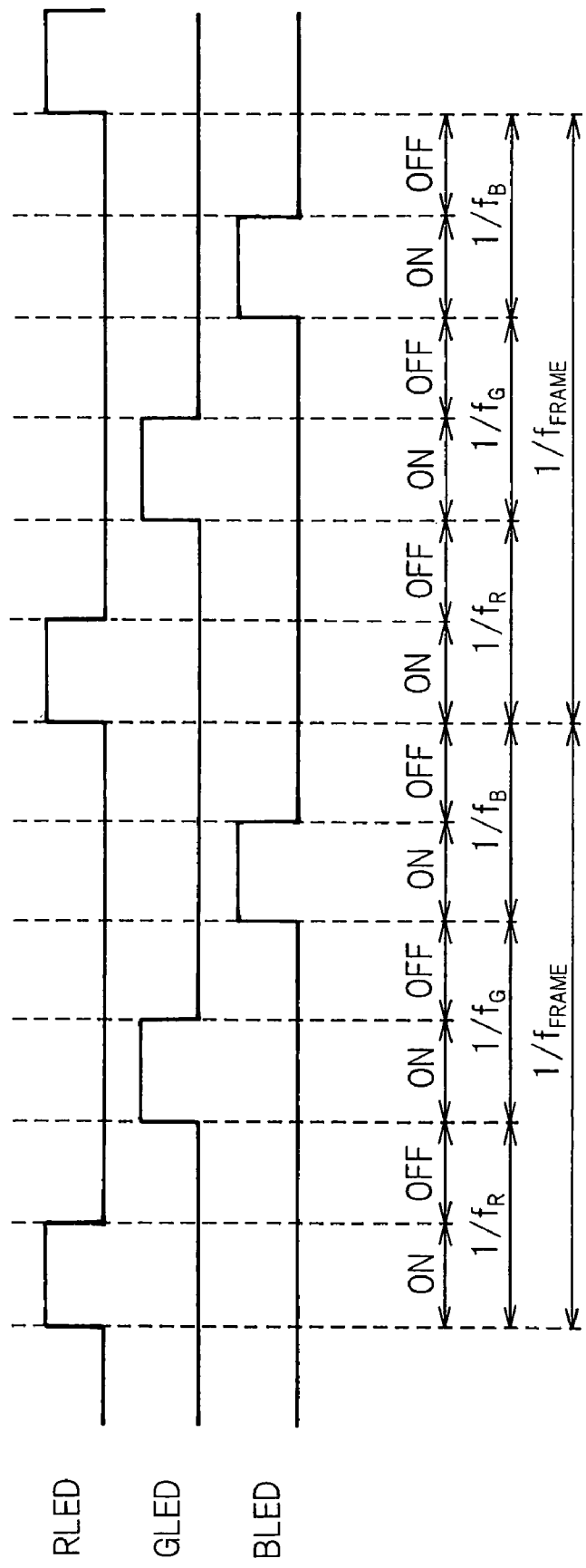
FIG. 2 is a timing chart for the first embodiment of the present invention.

FIG. 2 shows one example of a timing chart for the color display device 100.

In FIG. 2, the horizontal axis represents the time, and fFRAME designates the frequency with which the sequential emitting of the R LED 11, G LED 12, and B LED 13 in the light source (successively selected for light emission) is performed; in the first embodiment, this frequency is set to 30 Hz. Further, 1/fR, 1/fG, and 1/fB respectively indicate the periods (durations) during which the R LED 11, the G LED 12, and the B LED 13 are respectively selected, and each period consists of two periods, i.e., the ON period during which the LED emits light and the OFF period during which the LED is held OFF. In the first embodiment, the periods (durations) of 1/fR, 1/fG, and 1/fB are each set as a period (duration) equal to 1/90 Hz. The ratio of the ON period to the OFF period (duty ratio) is set to 50% in each of the LED light-emission periods fR, fG, and fB. In the OFF period, all the LEDs are OFF. In the first embodiment, in each of the periods (durations) 1/fR, 1/fG, and 1/fB, the corresponding LED in the light source is selected singly, but more than one LED may be simultaneously selected (this also applies to the other embodiments hereinafter described).

Next, the operation of the color display device 100 will be described.

The LED control circuit 3 shown in FIG. 1 drives each of the LEDs in the light source in accordance with the timing chart shown in FIG. 2. Light emitted from each LED repeatedly undergoes diffusion and reflection within the light-conducting plate 10 and emerges from the surface of the light-conducting plate 10 toward the light transmission adjusting member 2a acting as a light valve. Of the light entering the light transmission adjusting member 2a, the portion of the light entering the star-shaped area is transmitted to the viewer side (upward in FIG. 1), while the other portions of the light are absorbed and not transmitted to the viewer side (upward in FIG. 1) (that is, the light is blocked). In this way, when each LED is driven to emit light in accordance with the timing chart shown in FIG. 2, the viewer can view the light emitted from each LED and transmitted through the light transmission adjusting member 2a.

Figure 3:
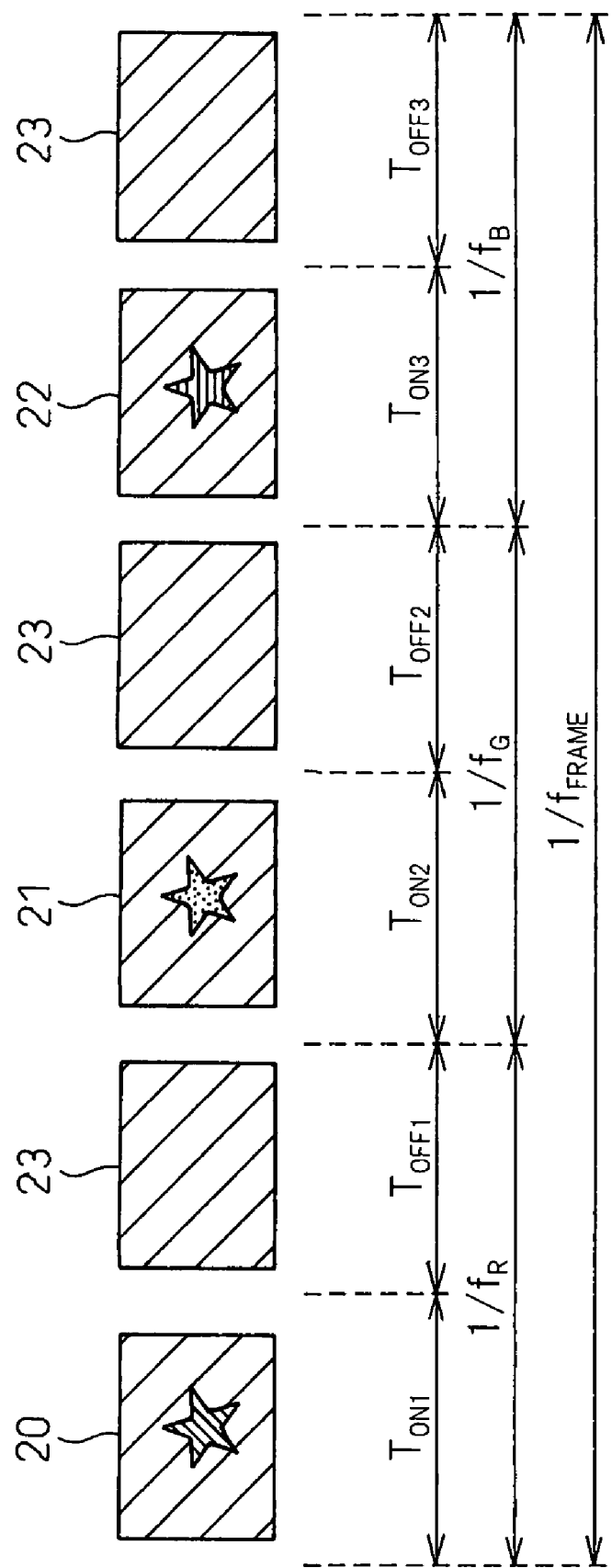
FIG. 3 is a diagram showing the transition of a display state according to the first embodiment of the present invention.

FIG. 3 is a diagram showing the transition of the viewing state.

In FIG. 3, display states 20 to 23 indicate the display states at respectively different times.

In FIG. 3, the display states 20, 21, and 22 indicate the display states when the R LED 11, the G LED 12, and the B LED 13 are respectively ON in the 1/fFRAME period, and the light emitted from each LED is visible through the star-shaped area. The display state 23 indicates the display state when all of the LEDs are OFF, and the entire area appears dark. Such a display state transition is repeated for each of the periods 1/fR, 1/fG, and 1/fB each consisting of the LED ON period and OFF period. In the first embodiment, the frequencies represented by fR, fG, and fG in the periods 1/fR, 1/fG, and 1/fB are each set to 90 Hz.

Generally, the response speed with which the human brain recognizes color is not very fast, and it is known that the human eye perceives color by integrating information along a time axis. CRTs which display images by scanning an electron gun utilize such persistence of vision, and because of this a viewer can perceive a series of images successively presented on the screen as a smooth continuous image. Television broadcasts, such as those based on the NTSC system, which uses interlaced scanning with a 60-Hz field frequency and a 30-Hz frame transfer frequency, achieve a display of smoothly moving images by utilizing the persistence of human vision. As the scanning speed of the electron gun or the television frame frequency is reduced, the human eye begins to respond, and brightness fluctuations become visible to the eye, a phenomenon called flicker. Flicker is dependent on the ambient brightness and the brightness of the object, but flicker becomes distinctly visible at frequencies of 20 Hz and lower, but becomes relatively unnoticeable at frequencies of 30 Hz and higher. Generally flicker completely disappears at frequencies of 60 Hz and higher. In the case of conventional color display devices, it is required to set the frequency to 60 Hz or higher at which such flicker disappears. On the other hand, in the present embodiment, the frame frequency is set to 30 Hz at which flicker virtually disappears.

The color display device 100 displays red, green, and blue stars by switching from one to another at a frequency of 90 Hz. As a result, the human eye cannot recognize red, green, and blue colors individually, but sees a mixture of these colors. In the case of light, color mixing is an additive process, and the display shown in FIG. 3 appears as a white star to a viewer. This is a traditional FSC driving scheme. The present embodiment, however, differs from the traditional scheme in that the frame frequency fFRAME is set to 30 Hz.

Figure 4:
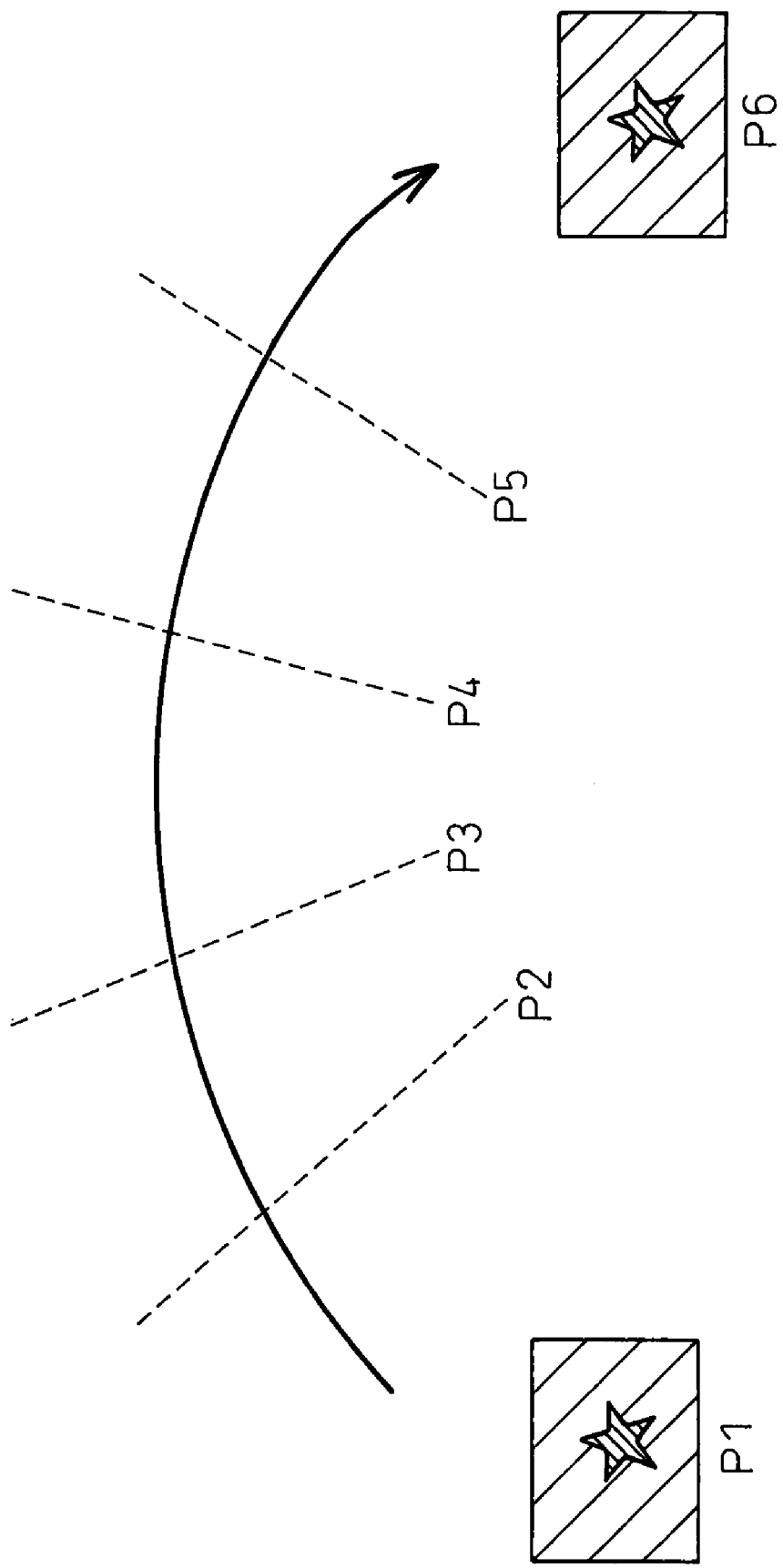
FIG. 4 is a diagram for explaining the first embodiment of the present invention.

FIG. 4 is a diagram for explaining a case in which a viewer views the color display device 100 while waving it from left to right.

Figure 5:
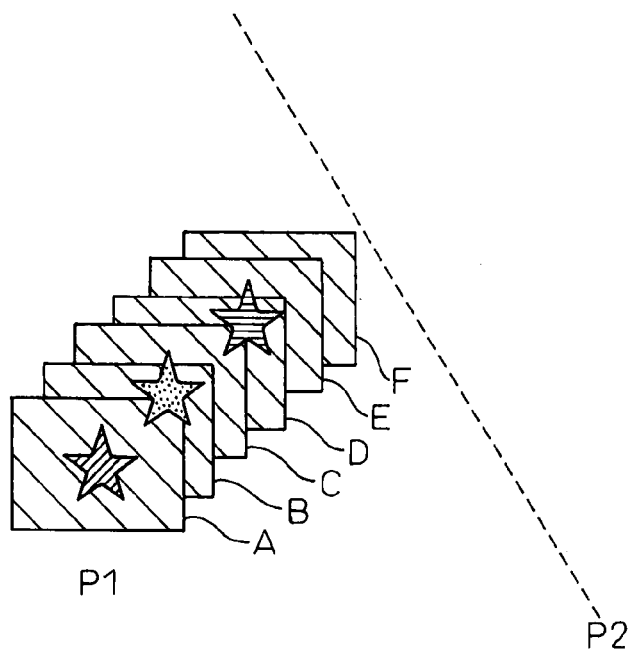
FIG. 5 is a diagram showing the transition of the display state from P1 to P2.

In FIG. 4, if a viewer waves the color display device 100 from position P1 to position P6 by passing it through positions P2, P3, P4, and P5, completing the waving motion in 166.6 ms. As previously described, the color display device 100 repeatedly turns on and off each of the RGB LEDs at a rate of 30 Hz (for every 33.3 ms) in accordance with the timing chart shown FIG. 2. Accordingly, the display produced every 33.3 ms is presented five times within the period of 166.6 ms. In FIG. 5, when the distance from position P1 to position P2 over which the color display device 100 is moved is divided into five equal sections, the display is produced once in every section. That is, display states 20 to 23 shown in FIG. 3 are produced once in every section.

FIG. 5 is a diagram showing the display states produced in section P1-P2.

As shown in FIG. 5, the display produced by the display state transition is such that the R LED is ON in first period A and OFF in the next period B, the G LED is ON in period C and OFF in period D, and the B LED is ON in period E and OFF in period F. The period from A to F is the same as each period shown in FIG. 3. When viewed from by viewer, a star emitted in red, a star emitted in green, and a star emitted in blue can be viewed at equally spaced positions, as shown in FIG. 5. At the frequency of 3 Hz, since the persistence of human vision also works, the respective stars appear as if they were floating in space. Since such display effects are produced at five positions between P1 and P6, the red, green, and blue stars, a total of five stars for each color, can be seen while the display device is being waved from P1 to P6.

Figure 6:
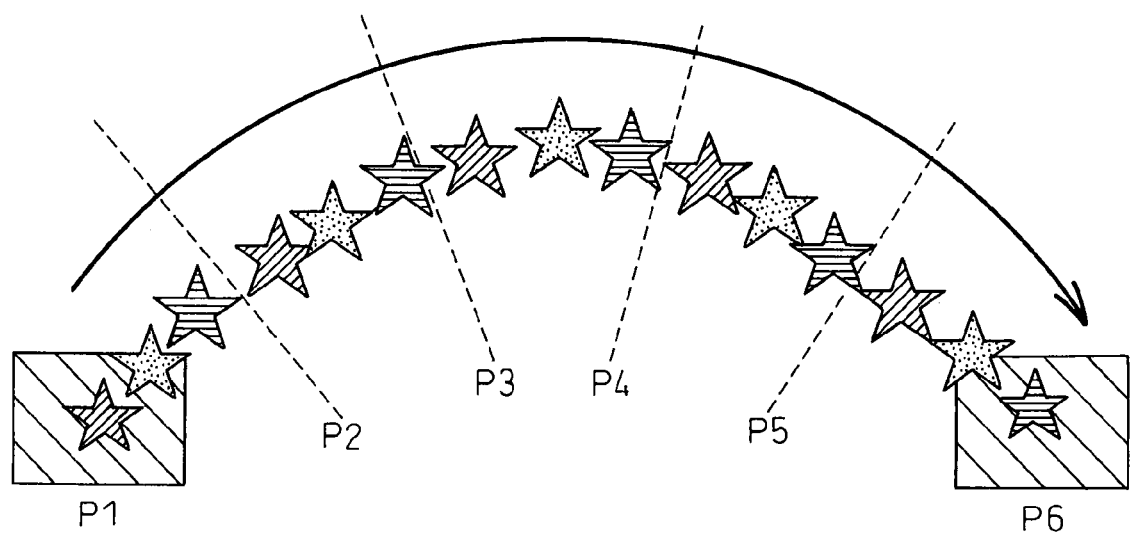
FIG. 6 is a diagram showing the transition of the display state from P1 to P6.

FIG. 6 is a diagram showing the display states produced between P1 and P6 in FIG. 4.

As shown in FIG. 6, three stars, red, green, and blue, are visible in each of the five sections between P1 and P6. In low ambient light conditions, the persistence of these display images becomes more visible and a succession of stars can be visually recognized.

What is important here is that when the color display device 100 is held stationary, since the red, green, and blue stars illuminate at the same position, the colors of the red, green, and blue stars are additively mixed, resulting in a display of a white star, as earlier described. That is, when the color display device is viewed by holding it stationary, a white star is displayed, but when the color display device 100 is moved, differently colored star-shaped images produced by the emission of the respective color LEDs become visible. This achieves a fashionable illumination (decorative lighting) display that has not been available with previously proposed display devices and that has the effect of enhancing customer appeal, or an illumination display that changes from moment to moment.

Such a display provides the illumination display effect not only to a user using the color display device 100, but also to surrounding viewers. For example, when such a display is produced while the user is walking or riding a bicycle, any viewer who happens to be around the user can see an extremely beautiful illumination, depending on the relative speed between the viewer and the user, since the red, green, and blue stars appear as if floating in space because of the persistence of vision.

In this way, one feature of the present invention is that the frame frequency is selected so that when the color display device 100 is held stationary, a mixture of different color images is viewed by the viewer, but when the color display device 100 is waved, different color images become visible as separate images.

To make the different color images visible as a single image of mixed colors when the color display device 100 is held stationary, the frame frequency must be set to 20 Hz or higher. For example, if the light source 1 of the color display device 100 is driven with a frame frequency of 19 Hz or lower, then even if the color display device 100 is held stationary, the viewer will see red, green, and blue stars as separate images switching from one to another.

Figure 28:
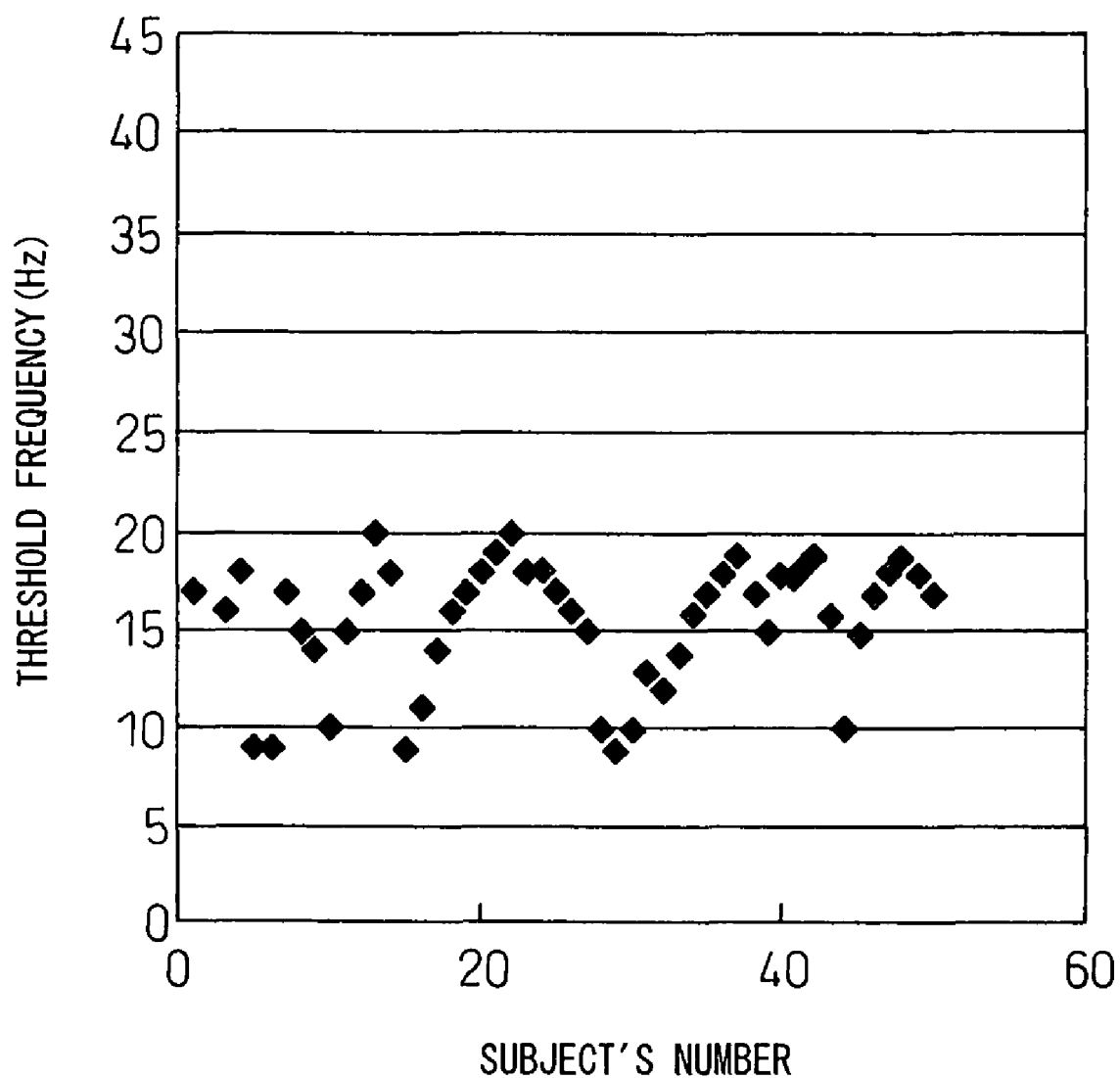
FIG. 28 is a diagram showing results of sensory testing.

To determine the above frame frequency, sensory testing was performed on 50 people. The results are shown in FIG. 28. In FIG. 28, the threshold frame frequency (Hz) is plotted along the ordinate, and the subject's number along the abscissa. In the experiment conducted here, the white luminance of the display of the color display device 100 was set to 300 nit, and the frame frequency was gradually reduced for each subject, to determine the lower limit frame frequency (threshold frame frequency) at and above which red, green, and blue stars are mixed together and seen as a single white image by the observer. From the results of FIG. 28, it can be determined that when the frame frequency is 20 Hz or higher, different color images are mixed together and seen as a single image to the eyes of most observers. The reason for this is believed to be that when the frame frequency is 20 Hz or higher, the image focused on the retina of the human eye switches from one to another so fast that the human eye cannot discriminate the color of each individual image.

On the other hand, to make the different color images visible as separate images when the color display device 100 is waved, the frame frequency must be set to 59 Hz or lower. For example, if the light source 1 of the color display device 100 is driven with a frame frequency of 60 Hz or higher, then even if the color display device 100 is waved, red, green, and blue stars are mixed together and seen as a single white star by the viewer.

To display the different color images so that they are visually recognized as separate images, the following condition must be satisfied: during the period T (s) between the end of the display of a certain image (for example, the image 20 in FIG. 3) and the start of the display of the next image (for example, the image 21 in FIG. 3), the color display device 100 must be moved over a distance longer than the length of the image if the images are to be visually recognized as separate images.

Referring to FIG. 3, T=Toff1 and T=6/F (where F is the frame frequency). That is, when the image length is L (mm), and the moving speed of the color display device 100 is Vf (mm/s), then Vf>L/T (F<6×Vf/L) should be satisfied.

Since the speed with which a person waves his hand is about 0.5 to 5 km/h (or the walking speed of a person is about 1 to 4 km/h: See FIG. 27), Vf is set to 0.5 to 5 km/h (139 to 1390 mm/s). Further, since the screen size of a mobile phone is from one inch to 2.4 inches, the image length L is set to 5 to 14 mm. From these relationships, the maximum value of F is obtained as F<6×139/14=59.6. Further, since the color break-up phenomenon does not generally occur when the frame frequency is 60 Hz or higher, in the present invention the frame frequency is set to 59 Hz or lower so that different color images are visually recognized as separate images when the color display device 100 is waved.

For the above reason, in the FSC type color display device according to the present invention, the frame frequency is set to a frequency within the range of 20 to 59 Hz.

In the color display device 100, the frame frequency is set to 30 Hz, but the frame frequency may be set to a suitable value within the range of 20 to 59 Hz according to the speed with which the user waves his hand, the size of the color display device, and the size of the display image (star-shaped image in the present embodiment).

That is, the lower limit of the frame frequency is 20 Hz, which is the threshold required to achieve additive color mixing, and the upper limit is 59 Hz, at or below which color break-up can be made to occur. Generally, at 60 Hz or higher frequencies, it is difficult for the color break-up phenomenon to occur, and the edges (fringes) of star-shaped images like those used in the present embodiment appear in red, green, and blue. This will only be perceived as display noise, and is nothing but the interference caused by the color break-up phenomenon, as has previously been the case. In the present embodiment, a novel illumination display can be achieved by setting the frame frequency at 30 Hz as in the color display device 100 and by interposing a period during which all the LEDs are held OFF between the emission period of one LED and the emission period of the next LED.

Figure 7:
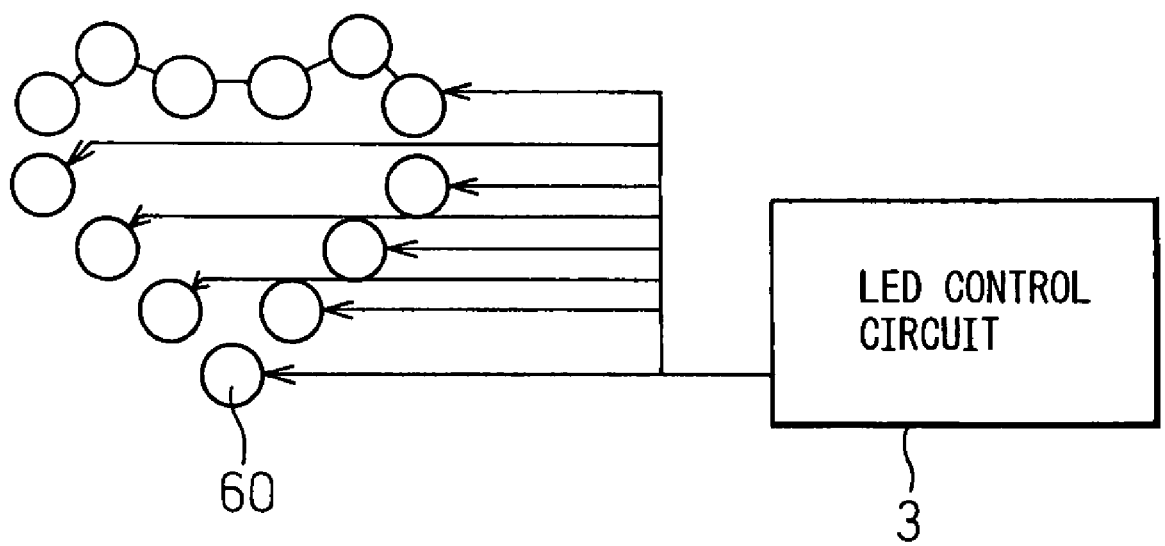
FIG. 7 is a diagram showing the configuration of a modified example of the first embodiment according to the present invention.

FIG. 7 is a diagram showing the configuration of a modified example of the first embodiment, in which the light panel or the light transmission adjusting member is not used.

In the modified example of FIG. 7, the light transmission adjusting member 2a is arranged as the light panel, but an illumination (decorative lighting) display can be achieved without using the light panel or the light transmission adjusting member.

The three-color LEDs 60 shown in FIG. 7 each comprise an R LED, a G LED, and a B LED contained in a single LED package. The three-color LEDs 60 are arranged in a heart-shaped pattern, and the R, G, and B LEDs, respectively connected on a color-by-color basis, are driven by the LED control circuit 3 in accordance with the timing chart of FIG. 2. In this configuration, by waving or moving the heart-shaped three-color LED array 60, the heart-shaped red, green, and blue illuminations can be viewed according to the moving speed. When the relative speed between the viewer and the color display device is 0, the colors are additively mixed, and white heart-shaped illumination can be viewed.

Figure 8:
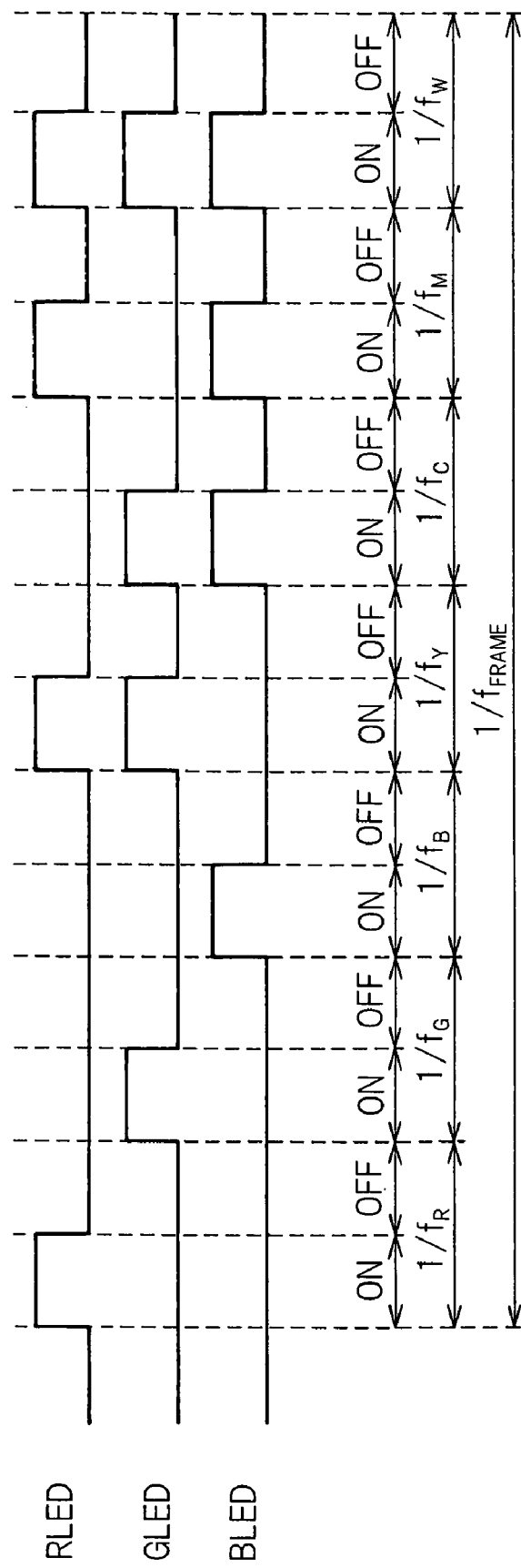
FIG. 8 is a timing chart for the modified example of the first embodiment according to the present invention.

FIG. 8 is a timing chart for the modified example shown in FIG. 7.

In the modified example shown in FIG. 7, R, G, and B LEDs have been used, but LEDs of other colors may be used. Further, in the present embodiment, the R, G, and B LEDs have been turned on in sequence and one at a time, but alternatively, the three R, G, and B may be turned on simultaneously, or any two of them may be turned on simultaneously, as shown in FIG. 8.

In FIG. 8, the R LED is turned on singly in the 1/fR period (duration), the G LED is turned on singly in the next 1/fG period, and the B LED is turned on singly in the next 1/fB period. Then, in the 1/fY period, the R and G LEDs are turned on simultaneously to produce yellow. In the next 1/fM period, the R and B LEDs are turned on simultaneously to produce magenta. In the next 1/fC period, the G and B LEDs are turned on simultaneously to produce cyan, and in the next 1/fW period, the R, G, and B LEDs are turned on simultaneously to produce white. That is, in FIG. 8, LEDs as light sources are selected one at a time or two or more in combination.

Here, when the frame frequency fFRAME is set to 30 Hz, the display appears white due to additive color mixing when the color display device is held stationary. On the other hand, when a user moves the color display device, for example, by waving it, red, green, blue, yellow, magenta, cyan, and white stars appear in this order and remain displayed in space due to persistence of vision. In this way, by simultaneously emitting the plurality of LEDs in various combinations, colors other than the inherent colors of the LEDs can be displayed by additive color mixing.

Furthermore, by varying the amount of light emission of each individual LED, various colors can be displayed. The amount of light emission can be varied by controlling the pulse to be applied to the LED during the ON period in FIG. 8 by using PWM, or by controlling the electric current to be flown to the LED during the ON period. Furthermore, by changing the amount of light emission and the combination of LEDs to be turned on from frame to frame, various colors can be displayed by additive color mixing even when the color display device is held stationary. Similarly, by changing the amount of light emission and the combination of LEDs to be turned on from frame to frame, stars of various colors can be presented for viewing when the color display device is waved. Such arrangement serves to further enhance the fashionable appearance of illumination and customer appeal.

Figure 9:
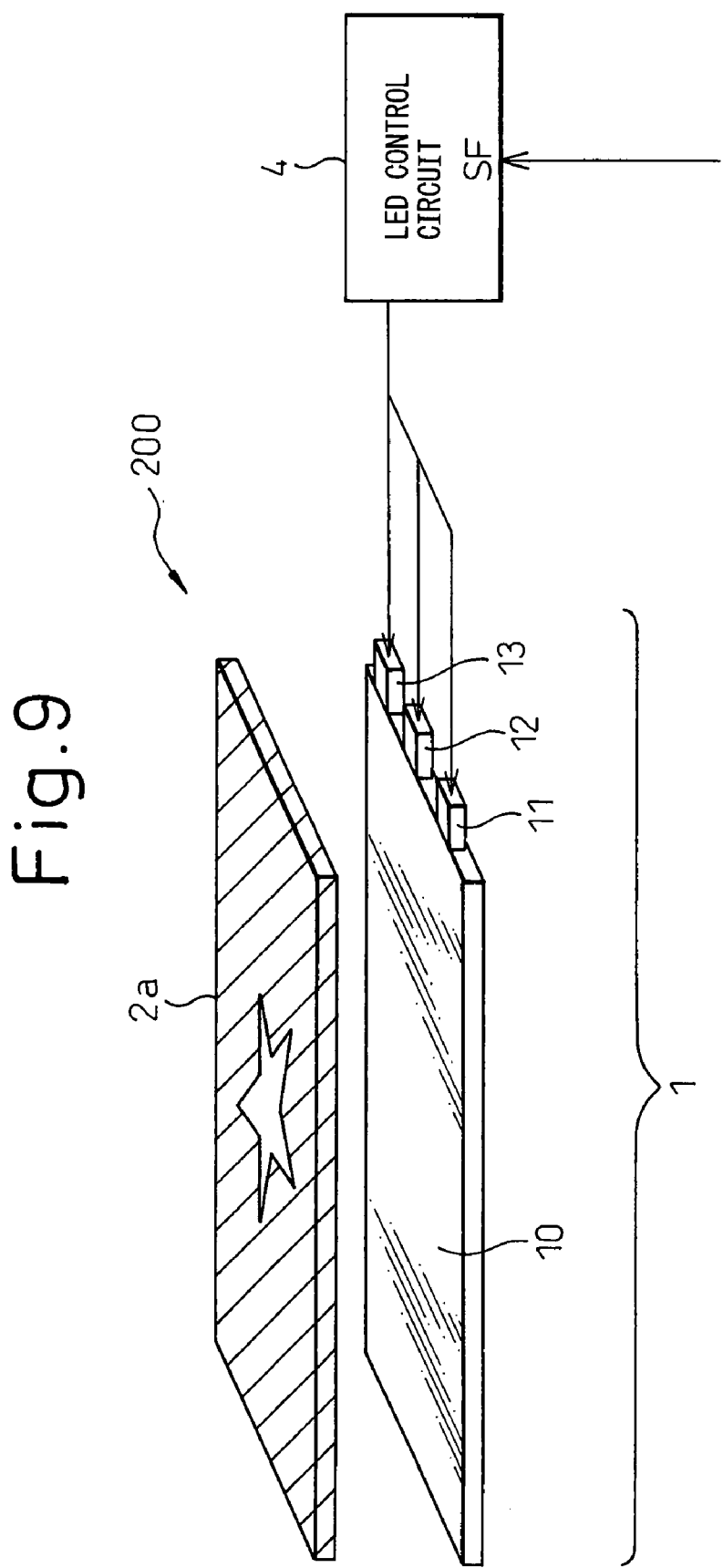
FIG. 9 is a diagram showing in simplified form the configuration of an FSC type color display device according to a second embodiment of the present invention.

FIG. 9 is a diagram showing in simplified form the configuration of a color display device 200 according to a second embodiment of the present invention.

As shown in FIG. 9, the color display device 200 comprises a light source 1, a light transmission adjusting member 2a, and an LED control circuit 4. The light source 1 and the light transmission adjusting member 2a are the same in configuration as those in the color display device 100 shown in FIG. 1.

The color display device 200 differs from the color display device 100 in the function of the LED control circuit 4. The LED control circuit 4 has the function of switching the LED frame driving frequency between 80 Hz and 30 Hz under the control of a signal applied to its SF terminal. When the signal applied to the SF terminal (hereinafter called the "SF signal") is SF=Lo, the display is set to a low-frequency driving mode in which the LEDs are driven at fFRAME1 (30 Hz), and when SF=Hi, the display is set to a high-frequency driving mode in which the LEDs are driven at fFRAME2 (80 Hz). In the present embodiment, the SF terminal is connected to an I/O port of an MPU (not shown) constituting a part or the whole of the LED control circuit, and is controlled by software.

Figure 10:
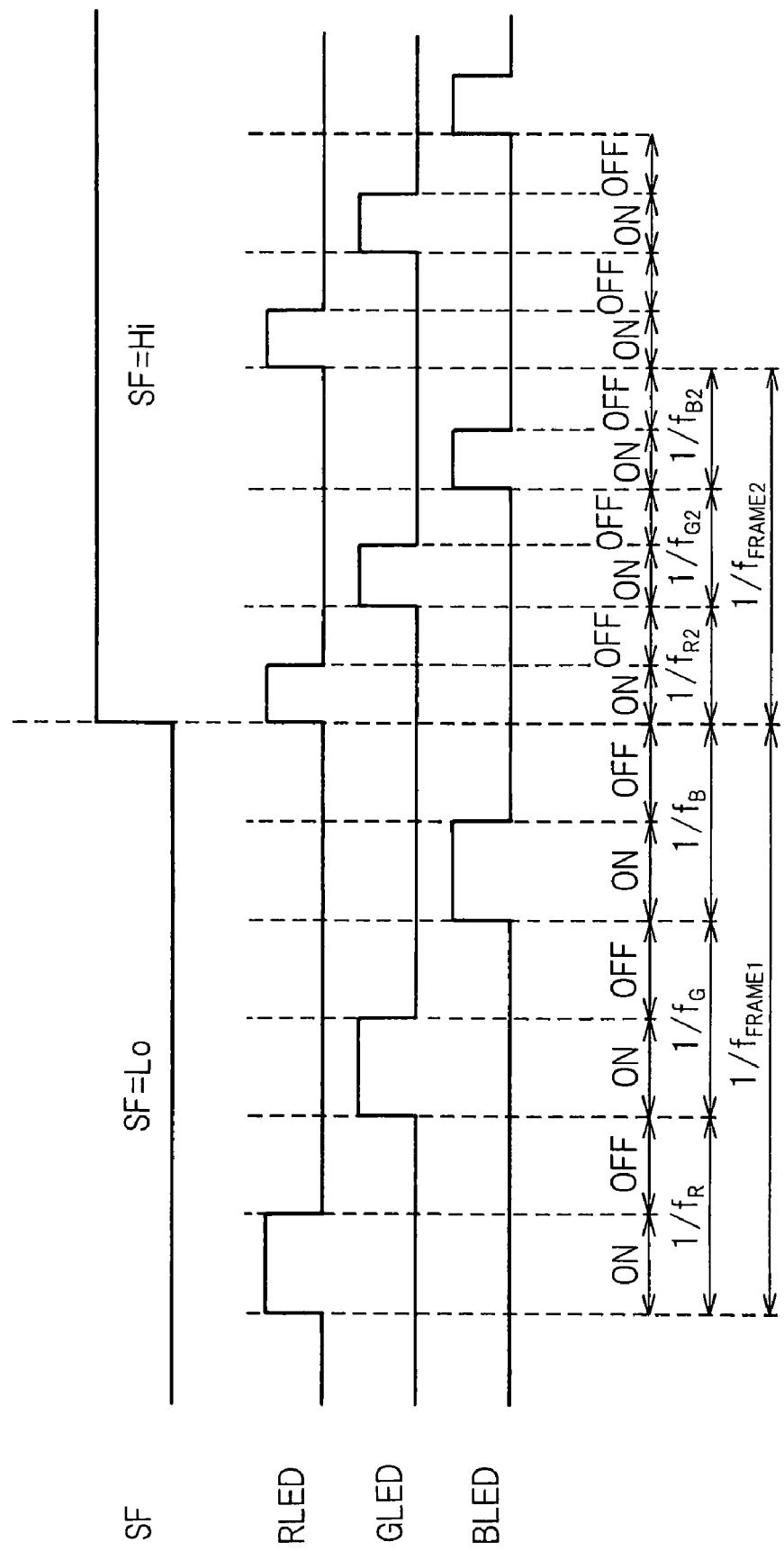
FIG. 10 is a timing chart for the second embodiment of the present invention.

FIG. 10 is a timing chart for the color display device 200.

In FIG. 10, "SF" indicates the waveform of the SF signal applied to the LED control circuit 4, and the signal state is switched between Hi and Lo at a given timing. FIG. 10 shows the waveform before and after the "SF" changes from Lo to Hi.

The periods 1/fR, 1/fG, and 1/fB indicate the light-emission periods of the respective LEDs in the low-frequency driving mode of SF=Lo. As in the first embodiment, frequencies fR, fG, and fB are each set to 90 Hz. In each of the periods 1/fR, 1/fG, and 1/fB, the corresponding LED is turned on and off with a duty cycle of 50%.

On the other hand, the periods 1/fR2, 1/fG2, and 1/fB2 indicate the light-emission periods of the respective LEDs in the high-frequency driving mode of SF=Hi. The frequencies fR2, fG2, and fB2 are each set to 240 Hz. In each of periods 1/fR2, 1/fG2, and 1/fB2, the corresponding LED is turned on and off with a duty cycle of 50%.

Next, the operation of the color display device 200 will be described.

When SF=Lo, the color display device 200 is driven in the low-frequency driving mode, and the operation in this case is the same as that of the color display device 100. When a relative speed exists between a viewer and the color display device, the light transmitted through the light transmission adjusting member 2a acting as a light panel is visually recognized as red, green, and blue at different positions in space because of the persistence of vision, thus achieving an illumination display effect.

When SF=Hi, the color display device 200 is driven in the high-frequency driving mode. If the screen refresh frequency is slow, flicker becomes visible, as previously described. The high-frequency driving mode is the mode used when the viewer views the information displayed on the color display device while holding it stationary. It is therefore desirable to reduce flicker by setting the frame frequency sufficiently fast.

In the color display device 200, the frame frequency in the high-frequency driving mode is set to 80 Hz, sufficiently higher than 60 Hz at and above which it is generally said that flicker disappears. In the high-frequency driving mode, when the displayed information is viewed by holding the color display device 200 stationary, the star-shaped images emitting in red, green, and blue at a high frequency of 240 Hz overlap each other and appear as a single white star-shaped image to the human eye because of additive color mixing. Furthermore, a white display completely free from flicker can be achieved using the FSC system.

Figure 11:
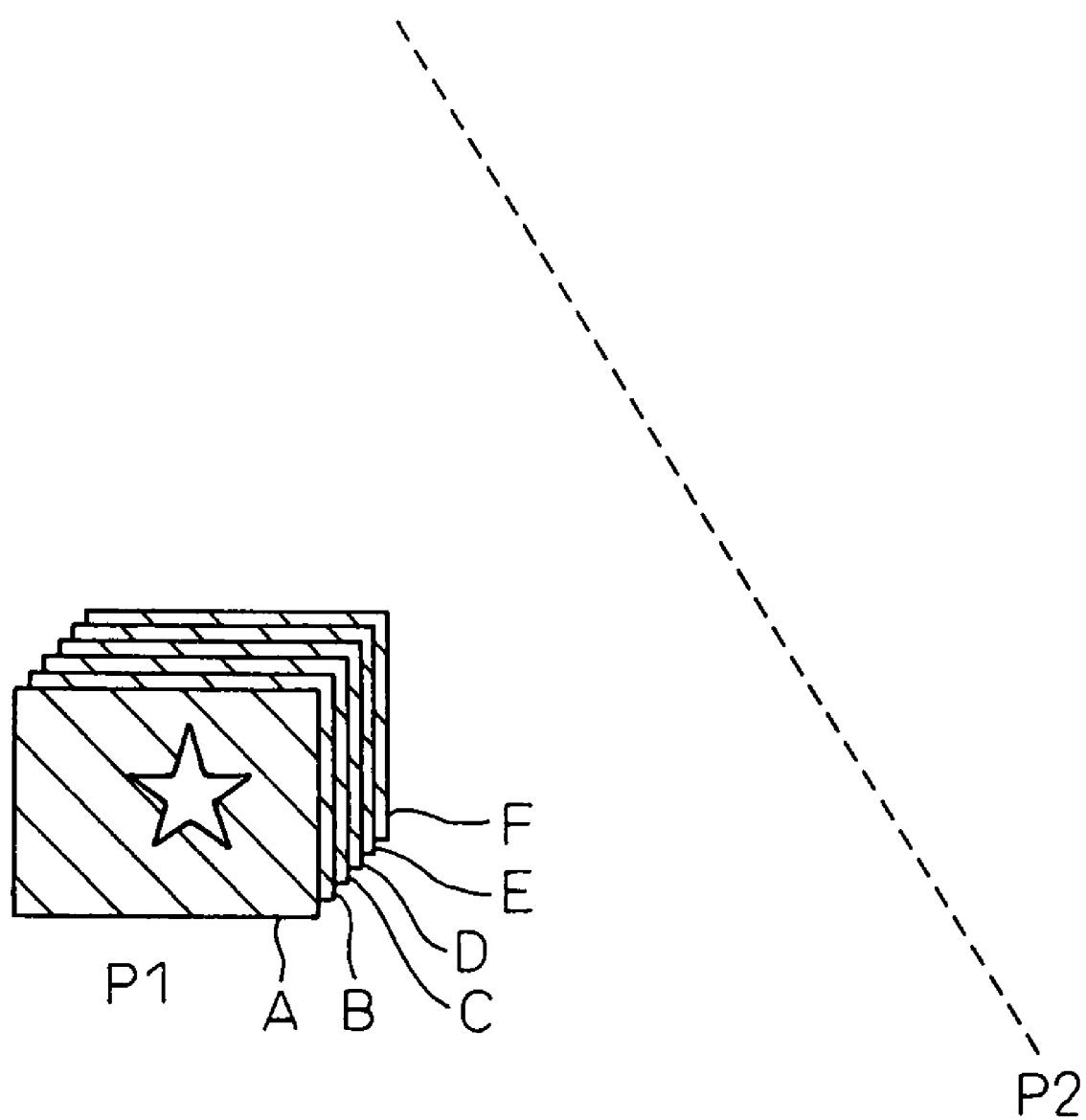
FIG. 11 is a diagram showing the transition of the display state according to the second embodiment of the present invention.

FIG. 11 is a diagram showing the transition of the display state in the color display device 200 according to the present invention.

Referring to FIGS. 4, 5, and 11, a description will be given for a case in which a user waves the color display device 200 in the high-frequency driving mode. As shown in FIG. 4, if the display device is moved from P1 to P6 in about 166 ms, as in the first embodiment, then in the high-frequency driving mode, since the display is driven at about 2.7 times the frequency at which it is driven in the low-frequency driving mode, the display produced in the section P1-P2 in FIG. 4 is as shown in FIG. 11. As shown in FIG. 11, the time required to transition from A to F is 2.7 times as short as the time in the low-frequency driving mode, and compared with the display state shown in FIG. 5, it can be seen that the star images are not separated from each other in FIG. 11. This is because the time required to transition from A to F is shorter than the time in which the display device moves over the distance equal to the size of the star-shaped display image. As a result, even when a viewer waves the color display device, the displayed image appears white because of additive color mixing. In practice, color break-up occurs along the edges of the star-shaped image because the red, green, and blue stars are slightly displaced from one another as shown in FIG. 11, but the color break-up is not great enough to pose a problem for visibility.

In this way, in the color display device 200, since the display is driven at a sufficiently high frequency (higher than 60 Hz) in the high-frequency driving mode, good display performance can be achieved as an FSC display, while in the low-frequency driving mode, the display can be used to produce an illumination display effect utilizing the FSC display scheme.

Figure 12:
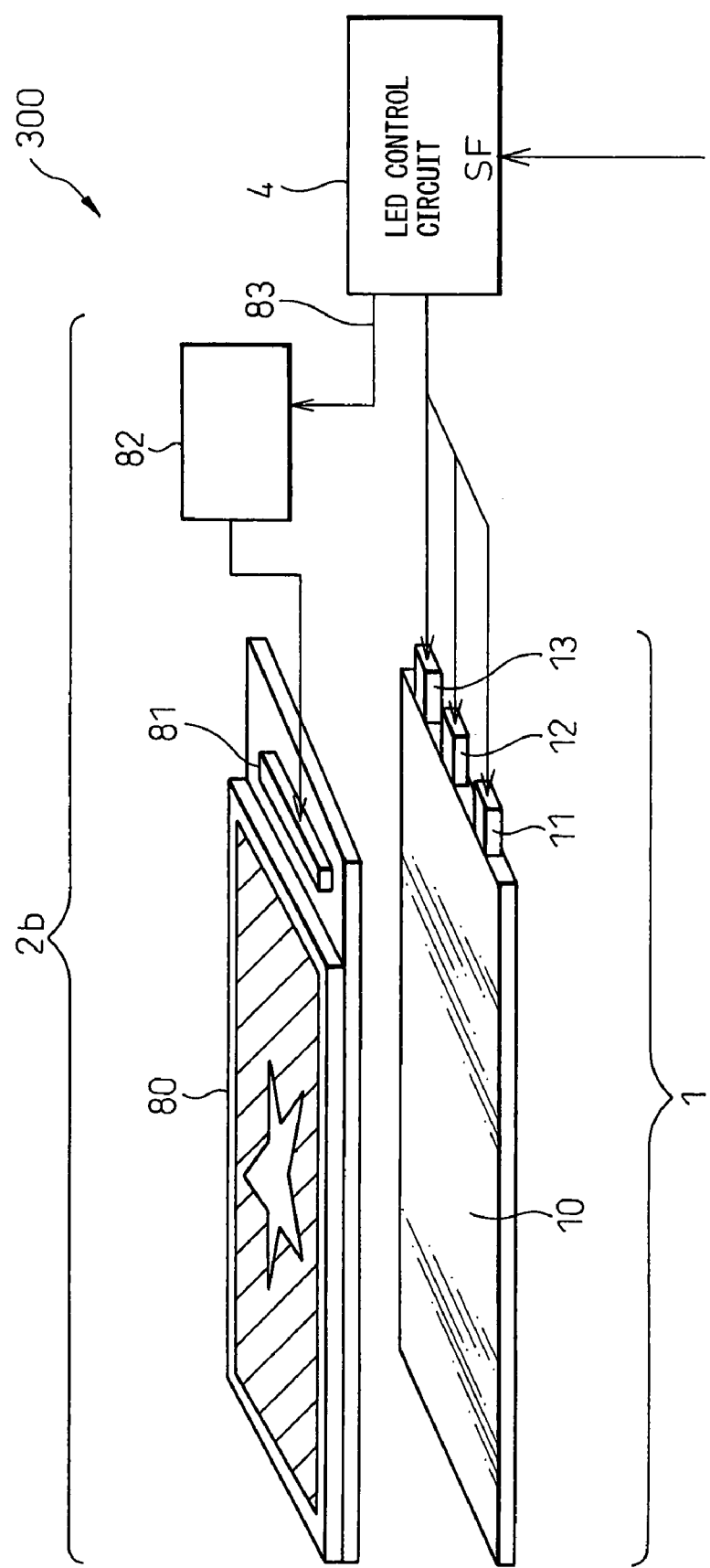
FIG. 12 is a diagram showing in simplified form the configuration of an FSC type color display device according to a third embodiment of the present invention.

FIG. 12 is a diagram showing in simplified form the configuration of a color display device 300 according to a third embodiment of the present invention.

As shown in FIG. 12, the color display device 300 comprises a light source 1, a liquid crystal display 2b, and an LED control circuit 4. The color display device 300 differs from the color display device 100 by the inclusion of the liquid crystal display 2b which acts as a light panel. In FIG. 12, parts having the same functions as those in FIG. 1 are designated by the same reference numerals as in FIG. 1.

As shown in FIG. 12, the liquid crystal display 2b comprises a liquid crystal panel 80, a liquid crystal driving integrated circuit 81, and a liquid crystal control circuit 82.

The liquid crystal panel 80 comprises a first glass substrate on which TFT devices are formed, one for each pixel, and on which source lines and gate lines are arranged, a second glass substrate on which a transparent electrode is formed, a sealing material for bonding the first and second glass substrates together, a liquid crystal material sandwiched between the first and second glass substrates and sealed by the sealing material, and polarizers attached to the outside surfaces of the first and second glass substrates.

The liquid crystal driving integrated circuit 81 is bonded by means of an anisotropic conductive seal to a projecting portion where the wiring lines of the first transparent substrate are brought out, and is electrically connected to the source lines and gate lines forming the transparent electrodes.

The liquid crystal control circuit 82 transfers timing clock data, image data, etc. to the liquid crystal driving integrated circuit 81 to drive the liquid crystal panel 80. The liquid crystal control circuit 82 is controlled from an MPU (not shown), etc. contained in the system in which the color display device is mounted.

A synchronization signal 83 is a signal for maintaining synchronization between the liquid crystal control circuit 82 and the LED control circuit 4, and is supplied from the LED control circuit 4 to the liquid crystal control circuit 82. The synchronization signal 83 includes a vertical synchronization signal, which indicates the beginning of each color frame, an emission synchronization signal, which indicates the emission timing of each LED, and a clock signal from which these synchronization signals are derived.

The MPU retrieves an image from memory (not shown), and creates a display image by performing processing, such as combining character fonts with the retrieved image, using prescribed software. Then, the MPU converts the thus created display image into RGB color image data, and transfers the RGB color image data to the liquid crystal control circuit 82. The liquid crystal control circuit 82 decomposes the RGB color image data into R image data, G image data, and B image data, and transfers them to the liquid crystal driving integrated circuit 81.

Figure 13:
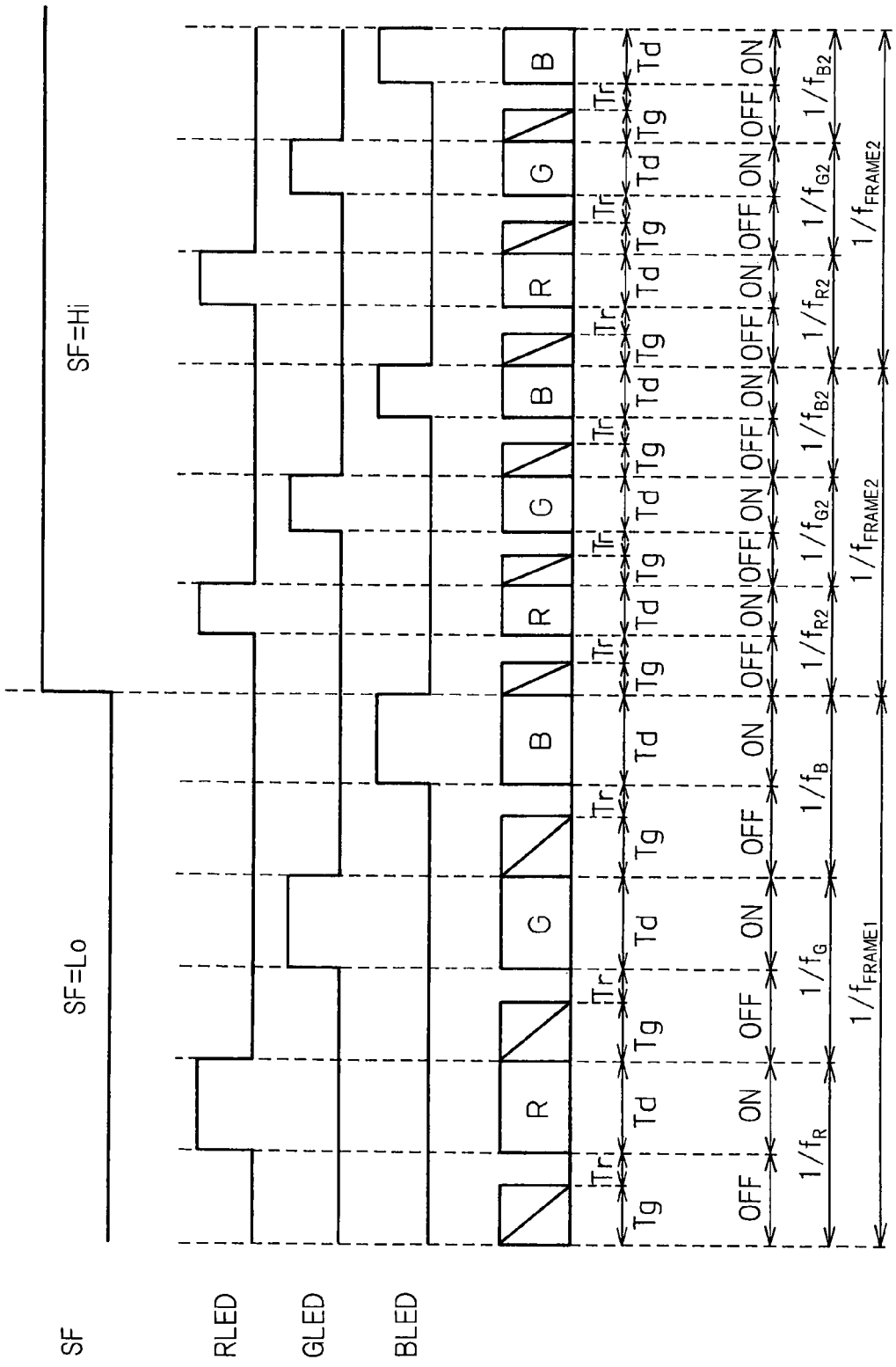
FIG. 13 is a timing chart for the third embodiment of the present invention.

The light source 1 is the same as that used in the color display device 200, and the respective LEDs are driven to emit light in accordance with the timing shown in FIG. 13.

FIG. 13 is a timing chart for the color display device 300 according to the present invention.

The display timing of the liquid crystal panel 80 that matches the emission timing of the respective LEDs will be described with reference to FIGS. 12 and 13.

First, the display of the R image will be described. As shown in FIG. 12, the liquid crystal control circuit 82 controls the liquid crystal driving integrated circuit 81 in accordance with the synchronization signal supplied from the LED control circuit 4. During a period Tg provided in the first half of the R LED light-emission period 1/fR shown in FIG. 13, the liquid crystal driving integrated circuit 81 sequentially drives the gate lines of the liquid crystal panel 80 while selectively writing data voltage to the source lines, thereby selectively applying voltage to the liquid crystal contained in the liquid crystal panel 80. The following period Tr is a liquid crystal response wait period, which is provided to allow time for the liquid crystal to respond to the applied voltage and to achieve the desired transmittance. The period that follows the response wait period Tr is the image display period Td. In the image display period Td, since the liquid crystal has responded in accordance with the R image data, the R LED is emitted to produce a display that matches the R image data. The operation is essentially the same for the G image display and the B image display.

As shown in FIG. 13, the image display timing of the liquid crystal panel 80 is synchronized to the driving frequency of each LED. In the low-frequency driving mode of SF=Lo, the display is driven at frame frequency=fFRAME1, while in the high-frequency driving mode of SF=Hi, the display is driven at frame frequency=fFRAME2. For example, if a white star is displayed on the liquid crystal panel 80, when a user waves the color display device, red, green, and blue stars are visible as shown in FIG. 5 in the low-frequency driving mode (the frame frequency is 20 to 59 Hz), while in the high-frequency driving mode (the frame frequency is 60 Hz or higher) a substantially white star is seen as shown in FIG. 11.

Further, using the liquid crystal panel 80, not only a fixed image, but various images can be displayed. When displaying a moving image or still image in the high-frequency driving mode, a clearer and crisper display can be achieved than in the case of a color filter type liquid crystal panel, because the FSC type color display device can achieve a higher brightness, higher saturation, and higher resolution. In the low-frequency driving mode, on the other hand, when displaying not only star-shaped images, but also various other patterns such as a heart-shaped pattern or a circular pattern, beautiful illumination display effects can be achieved in a variety of ways by utilizing the color break-up phenomenon. Further, in low-frequency driving mode, other display effects such as animation where the number of stars or the shape of the star changes, for example, can also be achieved. In this way, when the liquid crystal display 2b having the liquid crystal panel 80 is used as the light panel, a fashionable display that has never been possible before, as well as a display that has a good-will, can be achieved.

Further, by just controlling the LED control circuit 4 using software or the like, it is possible to produce a multicolored display or to change the emission speed of the LEDs as desired, thereby achieving a more fashionable emission pattern. It is also possible to display colors other than white in accordance with the timing chart shown in FIG. 8. In this way, in the third embodiment, the display can be switched between illumination display mode and FSC display mode in a simple manner by switching the LED control circuit 4 between the low-frequency driving mode and high-frequency driving mode.

Figure 14:
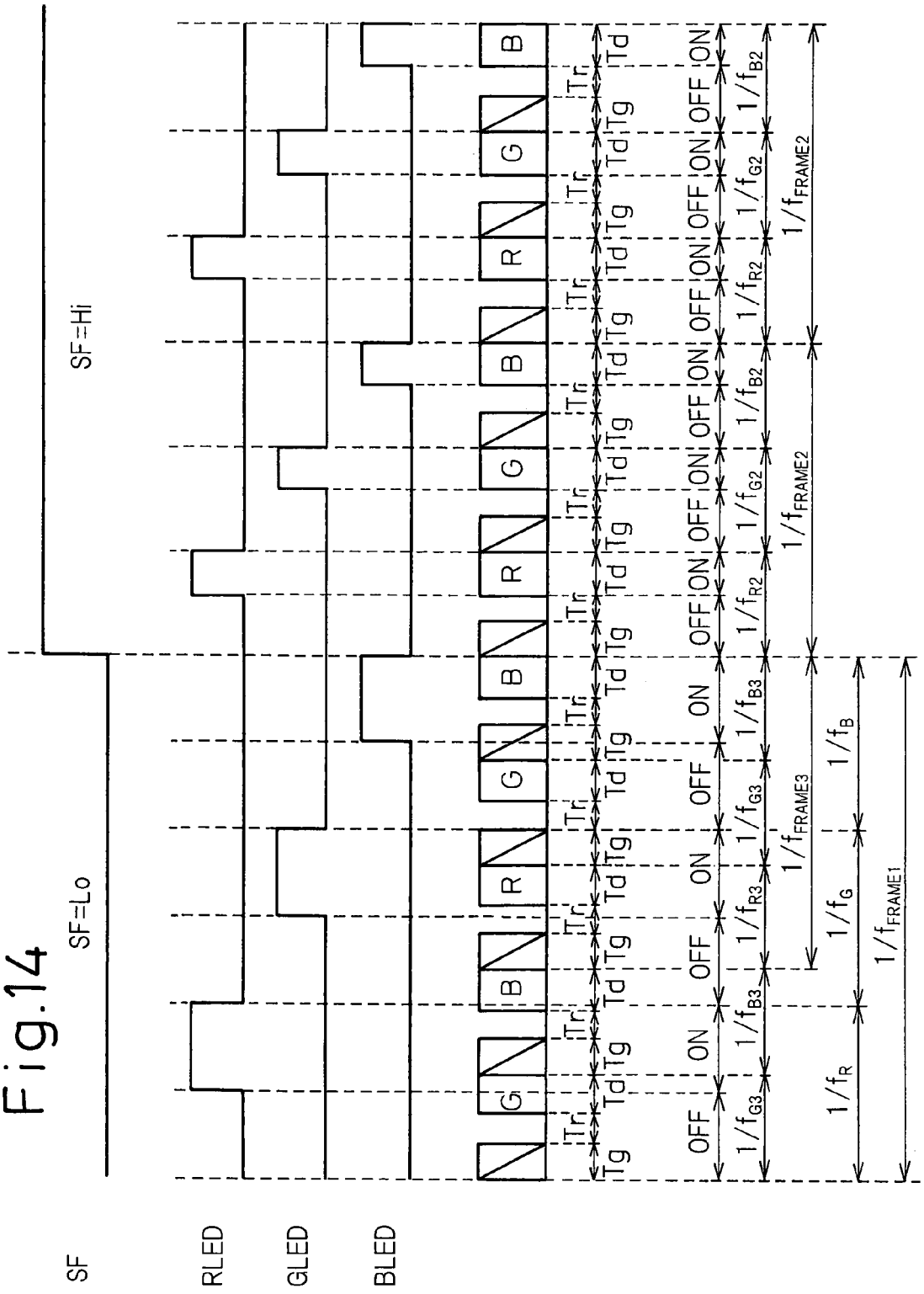
FIG. 14 is another timing chart for the third embodiment of the present invention.

FIG. 14 is another timing chart for the color display device 300 according to the present invention.

In the timing chart shown in FIG. 13, the image of each color has been displayed at the same frequency as that of the light-emission period of the corresponding LED. However, in the low-frequency driving mode (the frame frequency is 20 to 59 Hz), the image of each color does not necessarily need to be displayed at the same frequency as that of the light-emission period of the corresponding LED. For example, when displaying a white star on the display panel 80, since the displayed image is the same for all of the R, G, and B images, the same image is displayed, regardless of the driving frequency.

In view of this, in the low-frequency driving mode of SF=Lo shown in FIG. 14, the emission timing of each LED is not synchronized to the drive timing of the liquid crystal panel 80. In this case, a white star-shaped image can be displayed when the color display device is not waved or moved. Further, when a user waves or moves the color display device, different colored stars become visible as shown in FIG. 5.

In the period of SF=Lo in FIG. 14, 1/fG3, 1/fB3, and 1/fR3 are periods each consisting of Tg, Tr, and Td. Further, 1/fG3, 1/fB3, and 1/fR3 in the period of SF=Lo are respectively set equal to 1/fG2, 1/fB2, and 1/fR2 in the period of SF=Hi. Here, 1/fG3, 1/fB3, and 1/fR3 may be respectively set equal to 1/fG2, 1/fB2, and 1/fR2 or may be set differently. Further, 1/fG2, 1/fB2, and 1/fR2 may be set so as to have different lengths from each other. Furthermore, 1/fG3, 1/fB3, and 1/fR3 may be set so as to have different lengths from each other.

In FIG. 14, in the low-frequency driving mode as well as in the high-frequency driving mode, the drive timing of the liquid crystal panel 80 is synchronized to that in the high-frequency driving mode, irrespective of the SP signal state. The driving frequency of each LED is the same as that in FIG. 10. In the high-frequency driving mode, since the liquid crystal panel 80 is driven by being synchronized to the LED control circuit, the image can be displayed in full color by the usual FSC type driving.

In this way, since the liquid crystal panel 80 is driven in the low-frequency driving mode in the same manner as in the high-frequency driving mode, the example of FIG. 14 has the advantage that the configuration of the color display device containing the liquid crystal driving circuit 80 can be simplified.

Figure 15:
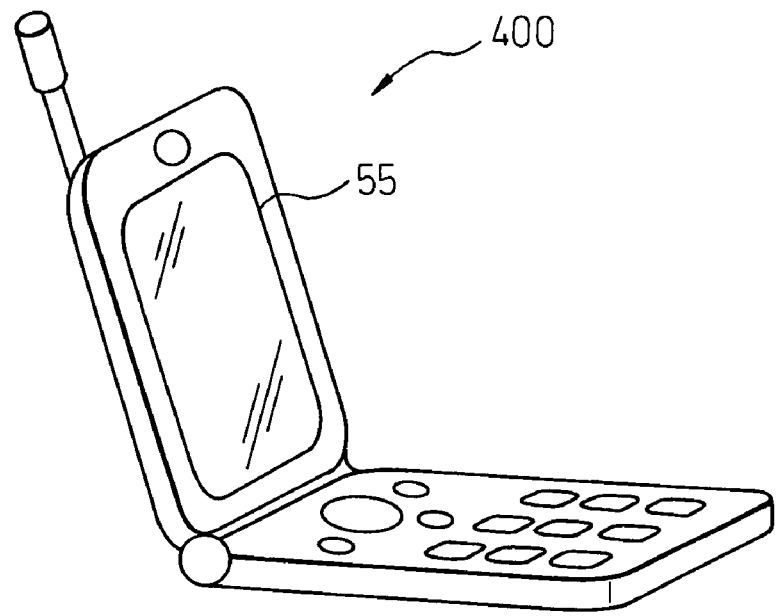
FIG. 15 is a simplified external view of a fourth embodiment of the present invention.
Figure 16:
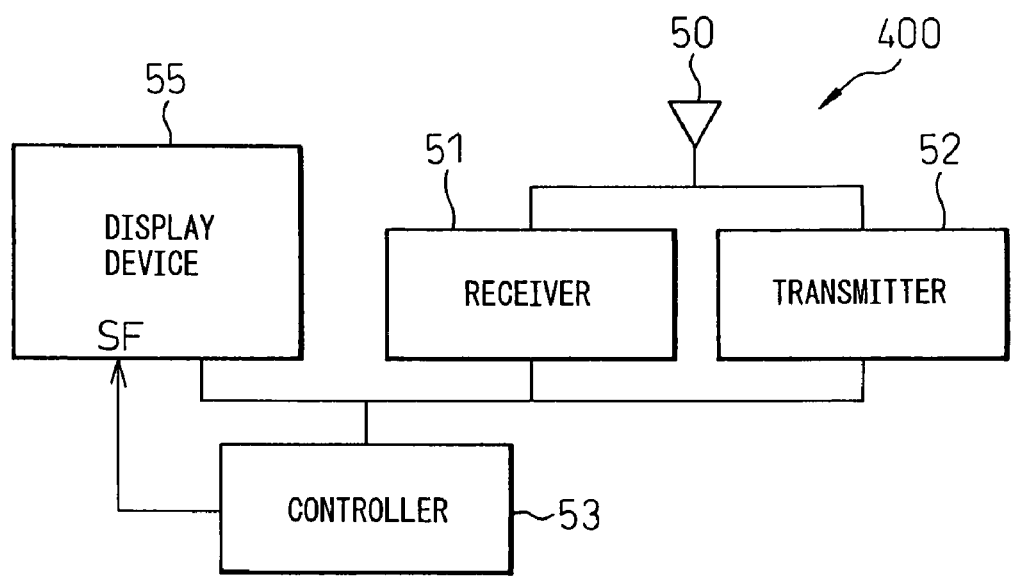
FIG. 16 is a simplified block diagram of the fourth embodiment shown in FIG. 15.

FIG. 15 is a simplified external view of a portable electronic appliance 400 according to a fourth embodiment of the present invention, and FIG. 16 is a simplified block diagram showing the configuration of the portable electronic appliance 400 of FIG. 15.

As shown in FIG. 16, the portable electronic appliance 400 is a mobile phone, and comprises a color display device 55, an antenna 50, a receiver 51, a transmitter 52, and a controller 53. Here, color display device 200 or 300 described above can be used as the color display device 55.

The controller 53 receives a receive signal from the receiver 51, transmits mail or voice via the transmitter 52, and generates a display image signal which is output to the color display device 55. A provision is also made so that the SF signal generated by the controller 53 can be applied to the SF terminal of the color display device 55. As described earlier for color display devices 200 and 300, the color display device 55 is switched between the low-frequency driving mode (the frame frequency is 20 to 59 Hz) and the high-frequency driving mode (the frame frequency is 60 Hz or higher) under the control of the SF signal.

Figure 17:
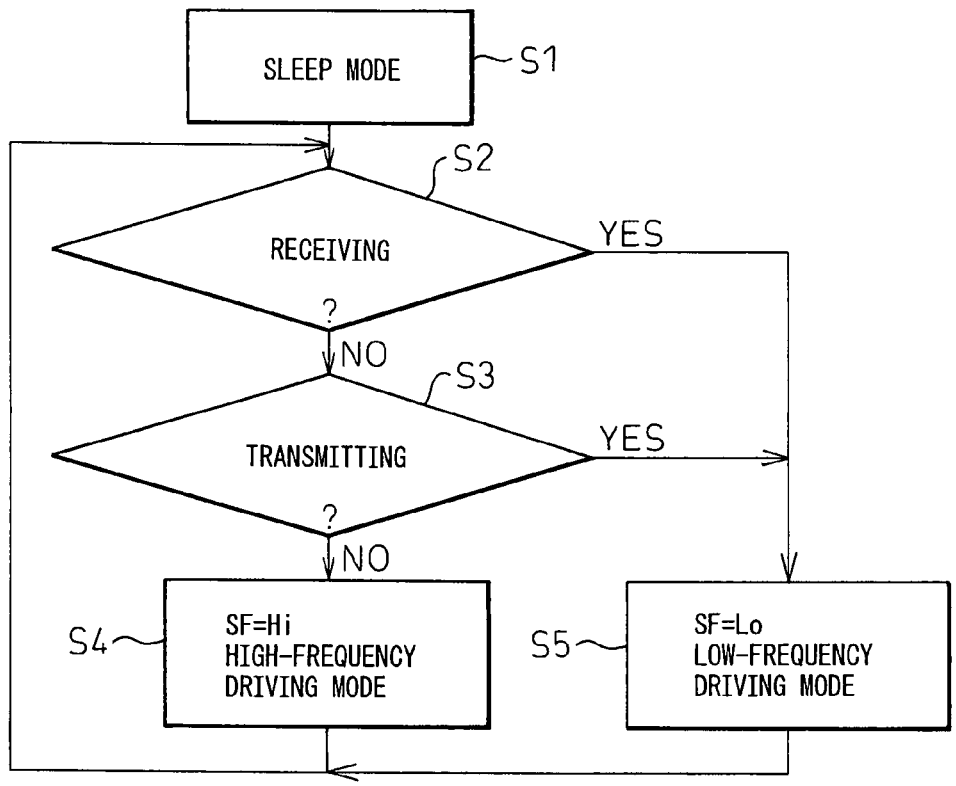
FIG. 17 is a diagram showing one example of a flowchart for mode switching.

FIG. 17 is a flowchart illustrating a procedure by which the controller 53 switches the SF signal.

As shown in FIG. 17, after exiting a sleep mode (S1), the controller 53 checks to see if incoming traffic such as a mail message or voice call is received or not (S2). If such incoming traffic is received, the SF signal is set to Lo to drive the color display device 55 in the low-frequency driving mode (S5). In this way, the color display device 55 can produce an illumination display in accordance with the low-frequency driving mode, and can thus indicate the arrival of incoming traffic to the user by attracting his attention using the illumination. If no incoming traffic is received, then it is determined whether the mobile phone is transmitting or not (S3). If the user is in the process of transmitting a mail message or making a voice communication, the SF signal is likewise set to Lo (S5) to produce an illumination display, which not only indicates to the user that the mobile phone is in the transmitting process, but also provides a fashionable illumination to viewers around the user, thus presenting a display that enhances customer appeal. When the mobile phone is not transmitting, the SF signal is set to Hi to produce the usual display in the high-frequency driving mode (S4).

The SF signal can also be switched in various other modes. For example, an illumination display can be produced while recharging the battery, or the user can forcefully effect the low-frequency driving mode by operating a key.

By switching between the low-frequency driving mode and the high-frequency driving mode under the control of the controller 53 of the mobile phone as described above, the display can be switched to the desired mode according to the state of the mobile phone. This not only serves to extend the interface for enabling a user to recognize the state of the mobile phone, but makes it possible to control the fashionable display to be presented to viewers located around the user.

Figure 18:
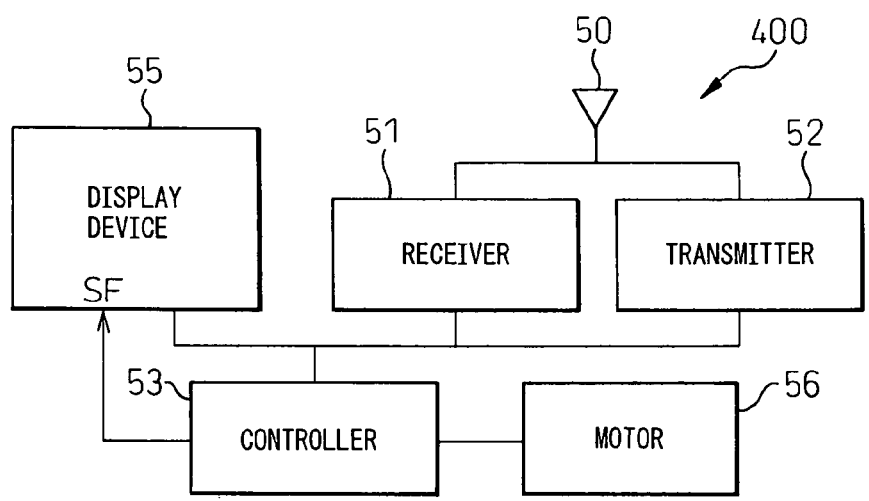
FIG. 18 is a simplified block diagram showing an another configuration of the fourth embodiment of the present invention.

FIG. 18 is a simplified block diagram showing an alternative configuration of the portable electronic appliance 400.

The only difference between FIG. 18 and FIG. 16 is that FIG. 18 includes a motor 56. Accordingly, the description of the reference numerals indicating the same components as those in FIG. 16 will not be repeated here. The motor 56 is used to indicate the arrival of a voice call or mail message to the user. For example, when the user gets on a train by setting his mobile phone to silent mode so as to not annoy other passengers by the ringing of the mobile phone, the arrival of an incoming call is signaled to the user by driving the motor 56 and vibrating the mobile phone. When the driving of the motor 56 is combined with the low-frequency driving mode, a further fashionable illumination display can be achieved.

Figure 19:
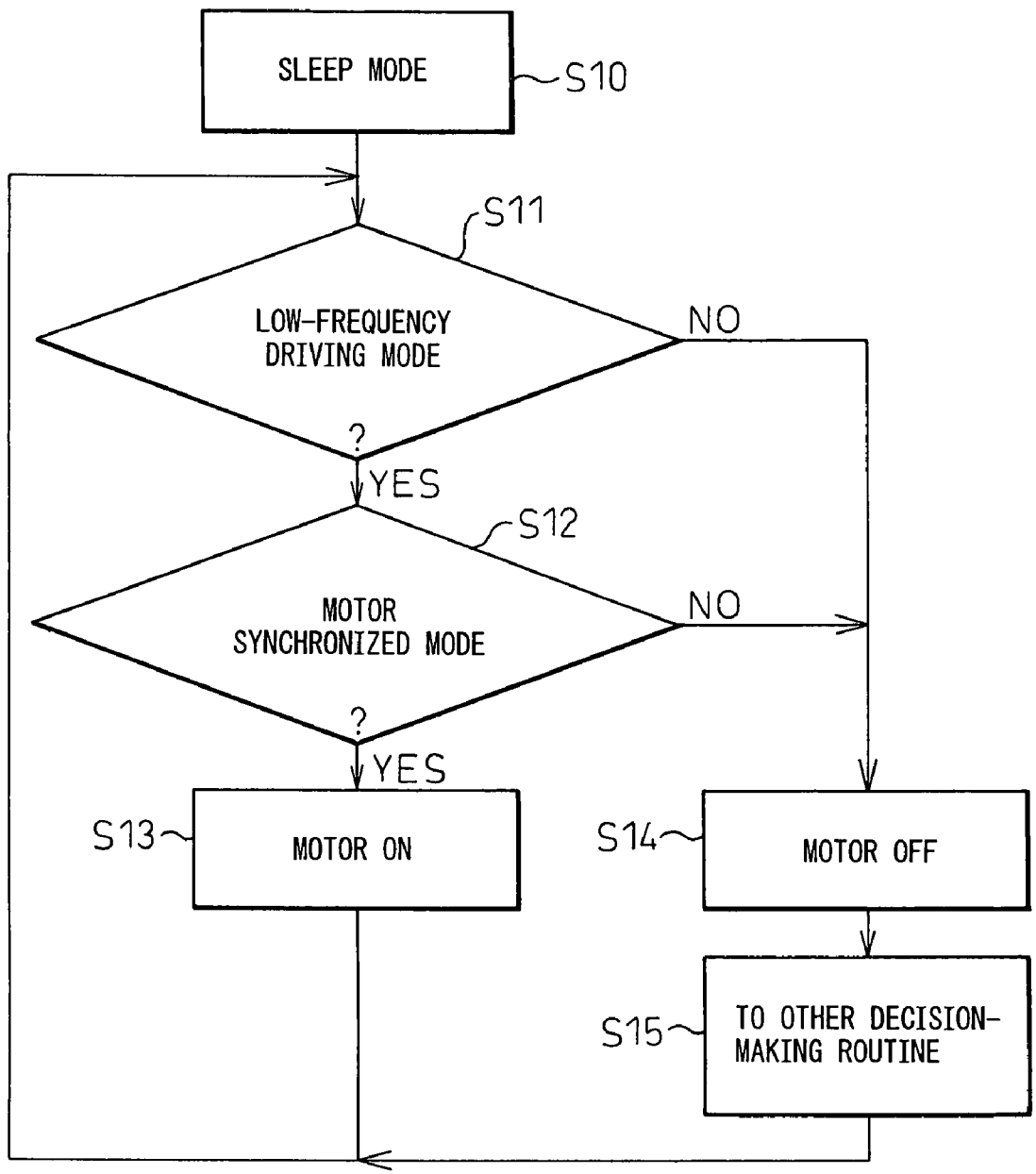
FIG. 19 is a flowchart illustrating one operational example of the configuration shown in FIG. 18.

FIG. 19 is a flowchart illustrating one example of the operation of the portable electronic appliance 400 having the configuration shown in FIG. 18.

As shown in FIG. 19, after resuming from the sleep mode (S10), the controller 53 checks the state to determine whether the display is in the low-frequency driving mode or not (S11). If it is not in the low-frequency driving mode, the motor is turned off as in the usual case (S14), and a branch is made to other decision-making routine for processing, for example, the arrival of an incoming call in silent mode (S15). When the display is in the low-frequency driving mode, it is determined whether the mode is a motor synchronized mode (S12). Here, a user can preset the motor synchronized mode ON or OFF by operating a key. If the mode is the motor synchronized mode, the motor 56 is turned on (S13). If it is not the motor synchronized mode, the motor is turned off (S14), and a branch is made to another decision-making routine (S15).

When the motor 56 is turned on in the low-frequency driving mode, the motor 56 rotates, causing the portable electronic appliance to vibrate. This provides an effect similar to that achieved when a user waves the color display device as earlier described in the first embodiment. The amplitude of the vibration caused by the motor 56 is smaller than that shown in FIG. 4, but since the display vibrates finer and faster than when it is waved by hand, decomposition of light into the R, G, and B colors repeatedly occurs in much smaller increments, and a fashionable effect different from the example of FIG. 4 can be achieved.

Figure 20:
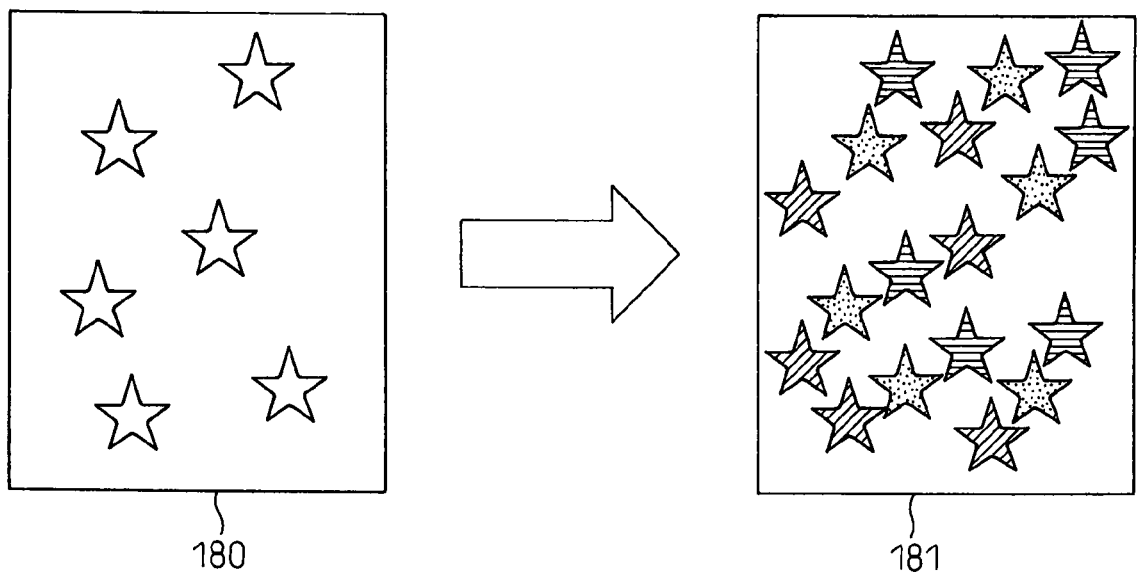
FIG. 20 is a diagram showing one example of a display image when a motor is used in a low-frequency driving mode.

FIG. 20 is a diagram showing one example of the display image when the motor is used in the low-frequency driving mode.

For example, in the case of a screen 180 on which many tiny stars are displayed, as shown in FIG. 20. In this case, when the motor 56 is turned on in accordance with the flowchart of FIG. 19, its vibration produces an effect as if many stars of R, G, and B colors were displayed within the screen (see the screen 181 in FIG. 20). When a user waves the display, as earlier described, the stars were seen as if dispersed in a large space, but in the example shown here, the stars are seen substantially within the screen. Furthermore, since the display of the stars is synchronized to the vibration, if the number of revolutions of the motor 56 or its timing is varied rhythmically, the stars can be displayed with the same rhythm, producing an extremely fashionable illumination display.

Figure 21:
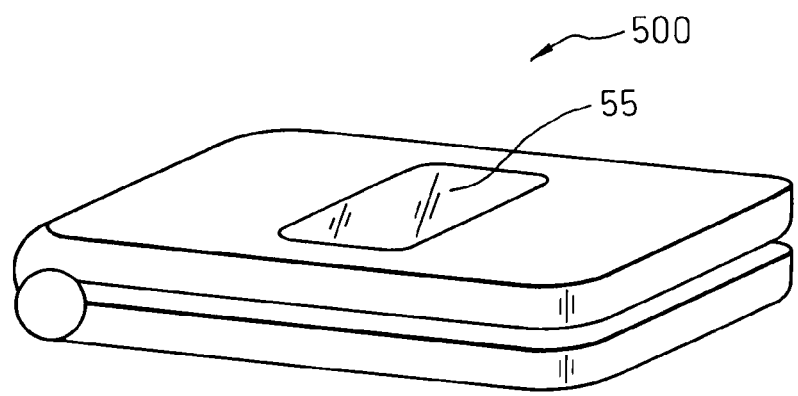
FIG. 21 is a simplified external view of a fifth embodiment of the present invention.
Figure 22:
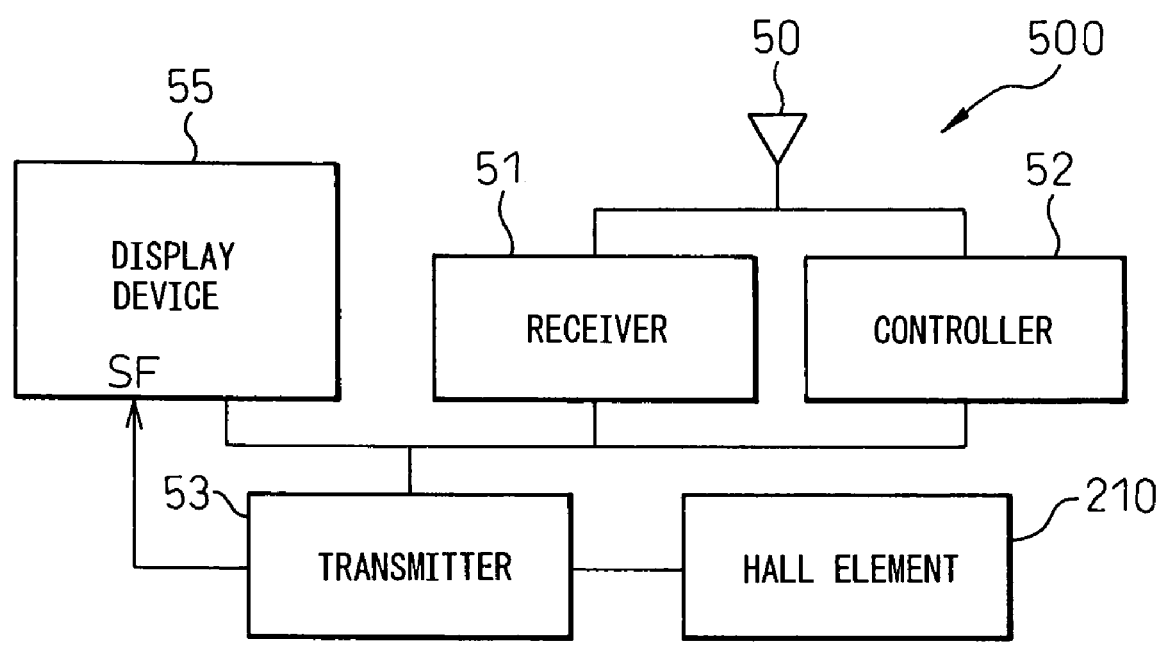
FIG. 22 is a simplified block diagram of the fifth embodiment of the present invention.

FIG. 21 is a simplified external view of a portable electronic appliance 500 according to a fifth embodiment of the present invention, and FIG. 22 is a simplified block diagram showing the configuration of the portable electronic appliance 500 of FIG. 21.

The portable electronic appliance 500 is a folding mobile phone, and is equipped on its rear side with an additional color display so that a user can check the time and other information such as the arrival of an incoming call even when the mobile phone is folded. The color display device 200 or 300 described earlier can be used as the color display device 55 to be mounted on the rear of the portable electronic appliance 500 shown in FIG. 21. The portable electronic appliance 500 has a built-in sensor for detecting whether the appliance is folded or unfolded. The sensor comprises a permanent magnet, which is mounted near the hinge of the casing incorporating the color display device 55, and a Hall element, which is mounted in the other casing at a position that faces the permanent magnet when one casing is folded over the other casing. The Hall element detects the distance to the permanent magnet, and determines whether the element is close to or away from the display-equipped casing, thereby detecting whether the appliance is folded or unfolded.

The only difference between FIG. 22 and FIG. 16 is that FIG. 22 includes the Hall element 210. As shown in FIG. 22, the Hall element 210 is connected to the controller 53. The controller 53 receives the signal that the Hall element 210 outputs by detecting the magnetic force, and controls the SF signal based on this detection signal.

Figure 23:
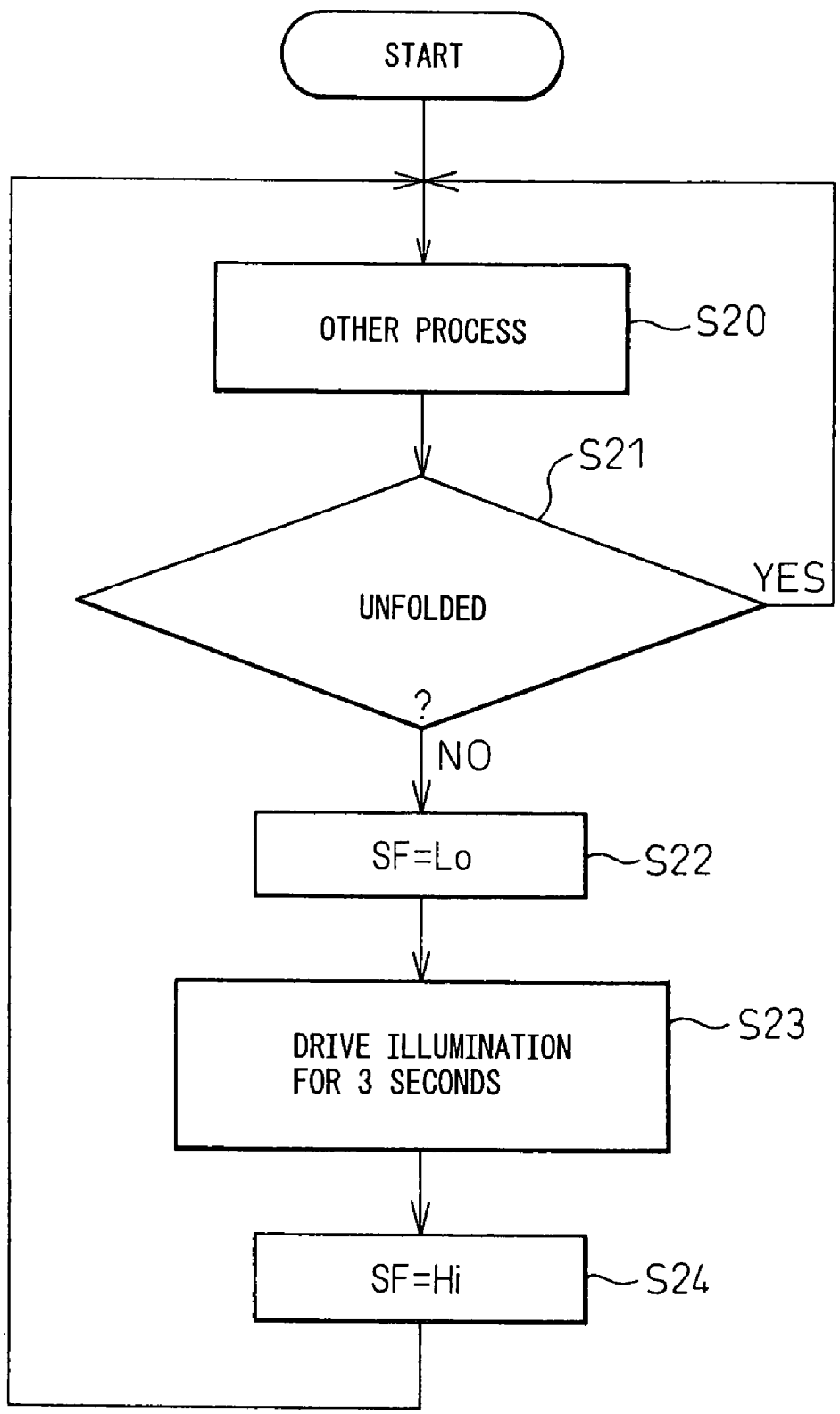
FIG. 23 is a flowchart showing one example of control according to the fifth embodiment of the present invention.

FIG. 23 is a flowchart showing one example of how control is performed in accordance with the folding/unfolding of the portable electronic appliance 500.

As shown in FIG. 23, after processing other routines, etc. (S20), the controller 53 checks whether the portable electronic appliance 500 is unfolded or not (S21). If it is determined based on the detection signal from the Hall element 210 that the portable electronic appliance 500 is unfolded, the process is transferred to other routines, etc. (S20). If it is determined based on the detection signal from the Hall element 210 that the portable electronic appliance 500 is folded up, the SF signal is set to Lo (S22). Then, for three seconds, an illumination display of a desired pattern is produced in the low-frequency driving mode (S23). After that, the SF signal is set back to Hi (S24), and the process proceeds to other routines, etc. (S20).

According to the control shown in the flowchart of FIG. 23, the user can enjoy an illumination display in the low-frequency driving mode for three seconds upon folding the portable electronic appliance 500 after finishing such operations as viewing a mail message or making a voice communication performed with the portable electronic appliance 500 unfolded.

Figure 24:
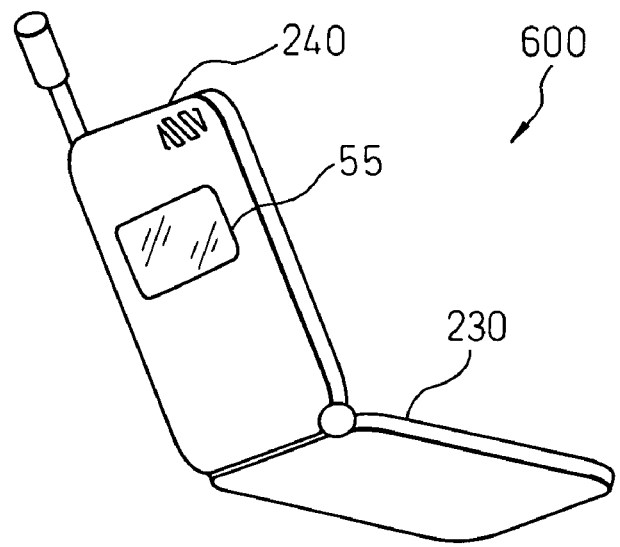
FIG. 24 is a simplified external view of a sixth embodiment of the present invention.
Figure 25:
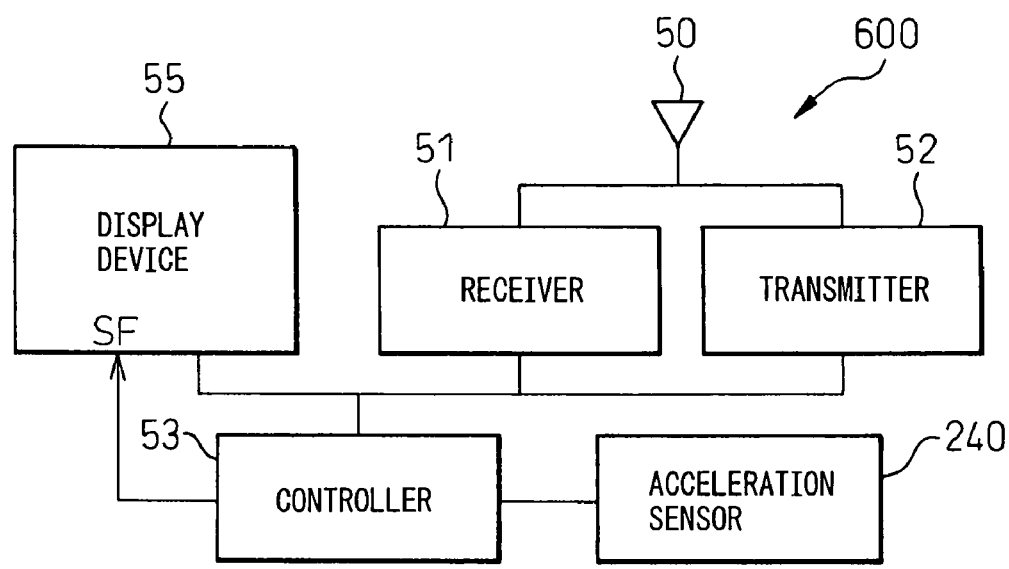
FIG. 25 is a simplified block diagram of the sixth embodiment of the present invention.

FIG. 24 is a simplified external view of a portable electronic appliance 600 according to a sixth embodiment of the present invention, and FIG. 25 is a simplified block diagram showing the configuration of the portable electronic appliance 600 of FIG. 24.

The only difference between FIG. 25 and FIG. 16 is that FIG. 25 includes an acceleration sensor 240.

The portable electronic appliance 600 is a folding mobile phone, and comprises an antenna 50, a color display device 55, a receiver 51, a transmitter 52, a controller 53, and the acceleration sensor 240. The color display device 55 is mounted on the rear of the casing so that it faces out when the casing is closed. The color display device 200 or 300 described earlier can be used as the color display device 55 to be mounted on the rear of the portable electronic appliance 600 shown in FIG. 24.

The acceleration sensor 240 is built into the casing in which the color display device 55 of the portable electronic appliance 600 is mounted. The reason for this is that when a user waves the portable electronic appliance 600 by holding it in his hand, the user usually holds the other casing, i.e., the casing opposite to the casing equipped with the color display device 55, and a greater acceleration can be obtained at the end farther from the point of support, thus serving to enhance the detection accuracy. A piezoresistive type sensor capable of detecting acceleration along two axes X-Y is used as the acceleration sensor 240. When a force due to acceleration is applied to a weight contained inside, the sensing element is deformed along X and Y in proportion to the applied force, causing the resistance value to change. The acceleration sensor 240 detects the change in the resistance value, and outputs X and Y digital signals. Based on the X and Y digital signals, the controller 53 can detect that the mobile phone is waved in the X or Y direction. A tilt sensor may be substituted for the acceleration sensor.

Figure 26:
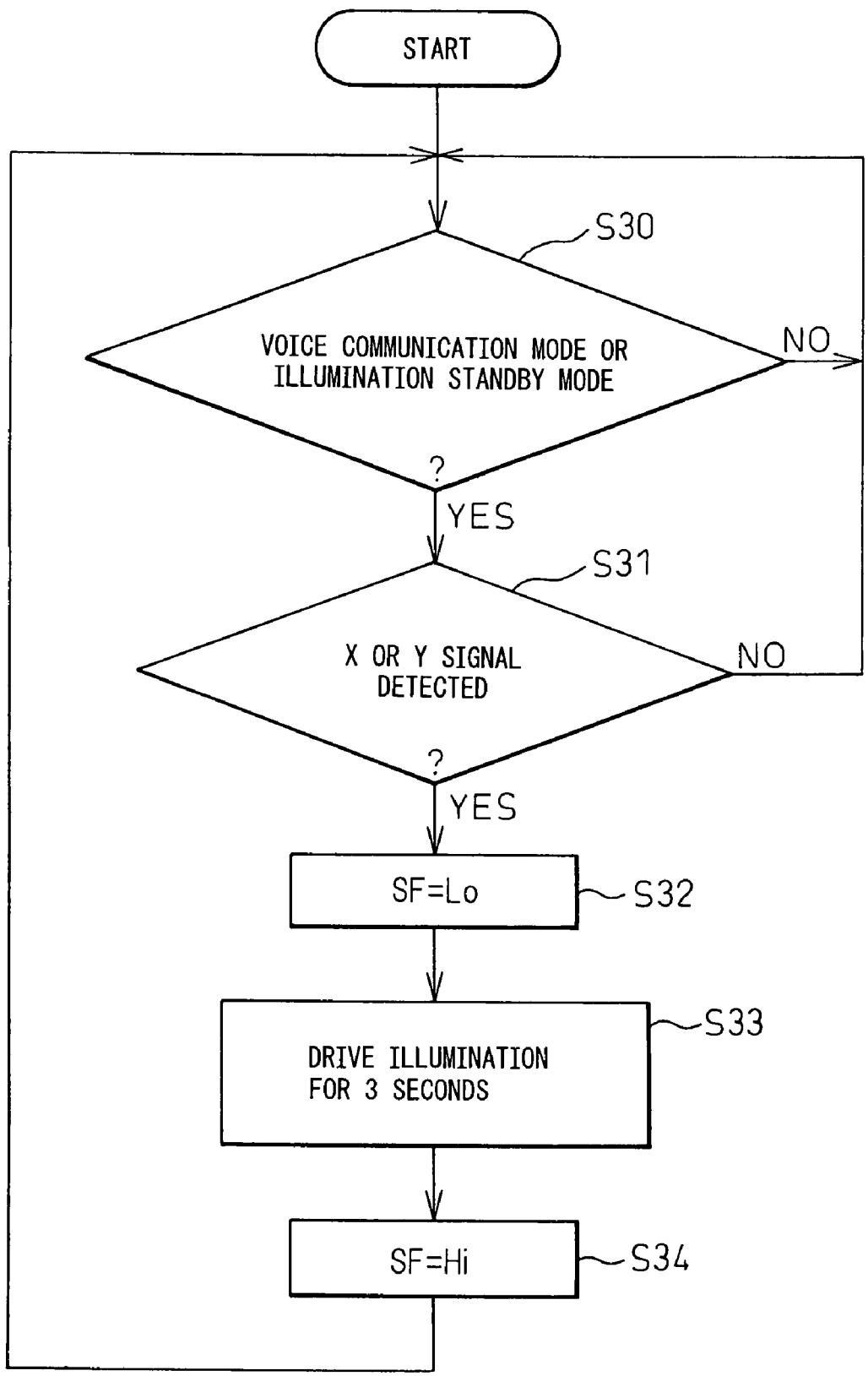
FIG. 26 is a flowchart showing one example of control according to the embodiment of the present invention.

FIG. 26 is a flowchart showing one example of how control is performed in the portable electronic appliance 600.

As shown in FIG. 26, first the controller 53 checks to determine whether the mobile phone is in a voice communication mode or whether the casing is opened (S30). That is, it is determined whether the casing is opened and the user is making a voice communication or transmitting a mail message or whether an illumination standby mode is effected by user operation though the casing is closed. If the voice communication, etc., is not in progress, the decision step of S30 is repeated. If the voice communication, etc., is in progress, then it is determined whether the X or Y digital signal from the acceleration sensor 240 is detected (S31). When the X or Y digital signal is detected, the SF signal is set to Lo (S32), and an illumination display is produced for three seconds (S33). After that, the SF signal is set back to Hi (S34), and the process returns to S30.

Figure 27:
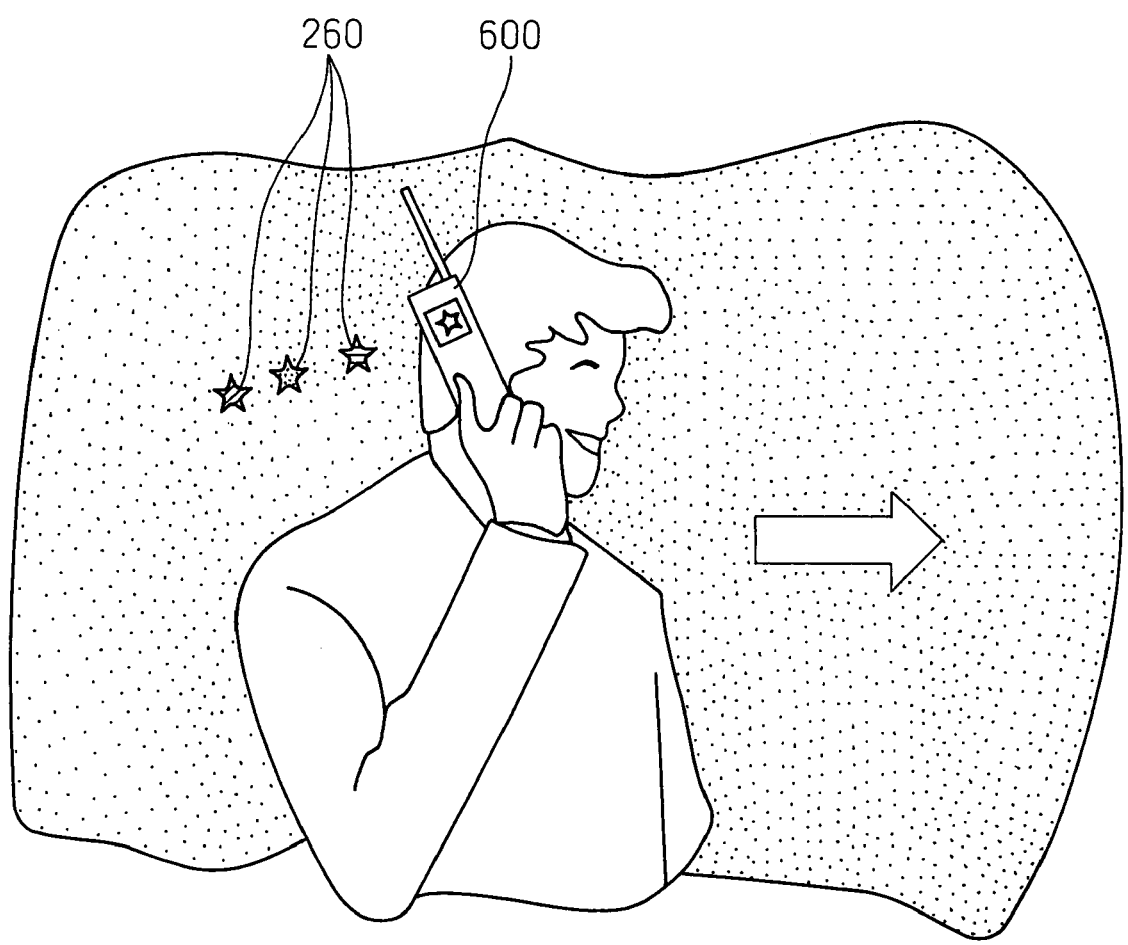
FIG. 27 is a diagram for explaining how the sixth embodiment of the present invention is used.

FIG. 27 is a diagram for explaining how the portable electronic appliance 600 shown in FIG. 24 is used.

During the three-second illumination display (S33), the white star shown in the third embodiment continues to be displayed on the color display device 55. When the user is stationary, and making a voice communication with the portable electronic appliance 600 unfolded, the X and Y digital signals from the acceleration sensor cannot be detected in the flowchart of FIG. 26. Accordingly, a dark screen with no illumination is displayed on the color display device 55 of the portable electronic appliance 600. On the other hand, when the user moves by walking in the direction indicated by an arrow in FIG. 27 (a person's walking speed is about 1 to 4 km), the X and Y digital signals from the acceleration sensor 240 are detected, and the SF signal is set to Lo, putting the color display device 55 into the low-frequency driving mode. Then, as the user is moving, red, green, and blue stars 260 are visible to surrounding viewers because of the persistence of vision. In a dark area, a brighter and more beautiful illumination display can be presented for viewing. Since the display is produced when motion is detected by the acceleration sensor 240, the illumination is usually not provided, but is provided only when the user is moving. Such illumination has the effect of attracting viewers attention.

As described above, according to the present invention, an illumination display effect can be produced by setting the frame frequency within a range of 20 Hz to 59 Hz for each period during which the plurality of light sources used in the FSC display system are sequentially emitted one at a time or two or more in combination. Further, by switching the frame frequency to 60 Hz or higher, the color break-up phenomenon can be alleviated in the normal display mode. On the other hand, in the illumination mode in which the frame frequency is set within a range of 20 Hz to 59 Hz, the color break-up phenomenon becomes easier to occur, so that, when a user moves the electronic appliance, for example, the plurality of light source colors become visible according to the amount of movement, thus achieving an attractive illumination effect.

The foregoing description has been given for color display devices having a light source and a light panel. However, for color display devices such as LED displays in which pixels are formed by simply arranging numerous light sources, effects and advantages similar to those offered by the present invention can also be achieved, for example, by providing a low-frequency driving mode and a high-frequency driving mode and switching between them in an appropriate manner. Furthermore, the present invention can also be applied to organic EL panels that have been commercially implemented in recent years. In such a case, since the organic EL panel comprises numerous organic LEDs, the organic LEDs forming the R, G, and B pixels should be driven in accordance with the FSC scheme. For example, in the first screen, the G and B LEDs are held OFF (black), and an image is written only to the R LEDs. The result is the display of an R image. In like manner, a G image and a B image are displayed in sequence. It is only necessary to drive the R image, G image, and B image in the low-frequency driving mode. In this way, an illumination effect can be achieved utilizing the color break-up phenomenon.

In the foregoing, the light sources have been constructed using LEDs, however, they may be made of cold-cathode tubes or organic ELs. Further, colored light sources constructed by combining white LEDs with color filters may also be used.

In the foregoing, the light panel has been constructed using the liquid crystal display 2b having a liquid crystal panel, but other types of display other than a liquid crystal display can be used in the present invention, provided that the display can control the transmission and blockage of light. For example, a display that electrically controls the transmission and blockage of light by electrically charging particles can also be used in the present invention. Furthermore, not only a transmissive type, but reflective type displays that can control reflection and absorption can also be used in the present invention. The color display device according to the present invention can also be applied, for example, to a reflective type liquid crystal panel or to the DMD developed by Texas Instruments.

While the above description has been given by dealing with examples in which the color display device according to the present invention is applied to mobile phones, the color display device can also be applied to other portable electronic appliances other than mobile phones.

What is claimed is:

1. A color display device comprising:
   a plurality of light sources having different emission wavelengths; and
   a light source controller for controlling said plurality of light sources to:
   sequentially and selectively emit light;
   repeat said sequential and selective emitting at a predetermined frequency; and
   switch between:
      a high-frequency driving mode, in which said light source controller controls said predetermined frequency to be equal to a first frequency that is 60 Hz or higher; and
      a low-frequency driving mode, in which said light source controller controls said predetermined frequency to be equal to a second frequency within a range of 20 Hz through 59 Hz, such that when said color display device is held stationary, colors emitted from said plurality of light sources are mixed and perceived as a single color, and when said color display device is in motion, colors emitted from different light sources are perceived as separate colors.

2. The color display device according to claim 1, further comprising an input terminal for receiving a signal for switching between said low-frequency driving mode and said high-frequency driving mode.

3. The color display device according to claim 1, further comprising a light panel disposed on a viewer side of said plurality of light sources.

4. The color display device according to claim 3, wherein said light panel includes a liquid crystal panel and a driving circuit for driving said liquid crystal panel.

5. The color display device according to claim 3, wherein said light panel is a light transmission adjusting member.

6. The color display device according to claim 3, further comprising a light panel controller for displaying images produced by said plurality of light sources onto said light panel,
   wherein a displaying frequency of said light panel controller is equal to said predetermined frequency.

7. The color display device according to claim 3, further comprising a light panel controller for displaying images produced by said plurality of light sources onto said light panel,
   wherein a displaying frequency of said light panel controller is set to be constant regardless whether said light source controller is in said low-frequency driving mode or in said high-frequency driving mode.

8. The color display device according to claim 7, wherein said displaying frequency of said light panel controller is set to be equal to said second frequency.

9. A portable electronic appliance comprising:
   a plurality of light sources having different emission wavelengths; and
   a light source controller for controlling said plurality of light sources to:
   sequentially and selectively emit light;
   repeat said sequential and selective emitting at a predetermined frequency; and
   switch between:
      an image display mode, in which said light source controller controls said predetermined frequency to be equal to a first frequency that is 60 Hz or higher; and
      an illumination mode, in which said light source controller controls said predetermined frequency to be equal to a second frequency within a range of 20 Hz to 59 Hz such that, when said portable electronic appliance is held stationary, colors emitted from said plurality of light sources are mixed and perceived as a single color, and when said portable electronic appliance is in motion, the colors emitted from different light sources are perceived as separate colors.

10. The portable electronic appliance according to claim 9, wherein said light source controller switches between said illumination mode and said image display mode according to whether said portable electronic appliance is in a voice communication mode or not.

11. The portable electronic appliance according to claim 9, further comprising a motor for vibrating said electronic appliance in order to indicate an incoming call to a user, and wherein said light source controller switches between said illumination mode and said image display mode according to whether said motor is driven or not.

12. The portable electronic appliance according to claim 9, further comprising a first casing, a second casing, a hinge for connecting said first casing and said second casing in a rotatable manner, and a detector for detecting the rotation of said hinge, and wherein switching is made between said illumination mode and said image display mode according to whether or not said detector has detected the rotation of said hinge.

13. The portable electronic appliance according to claim 9, further comprising a detector for detecting arrival of a mail message or an incoming call, and wherein switching is made between said illumination mode and said image display mode according to whether or not said detector has detected the arrival of a mail message or an incoming call.

14. The portable electronic appliance according to claim 9, further comprising an acceleration sensor or a tilt sensor, and wherein switching is made between said illumination mode and said image display mode according to a result of detection performed by said acceleration sensor or tilt sensor.

\* \* \* \* \*